United States Patent
Lehman et al.

(10) Patent No.: US 10,759,396 B2
(45) Date of Patent: Sep. 1, 2020

(54) ATTACHABLE LEVELING SYSTEM

(71) Applicant: Quadra Manufacturing, Inc., White Pigeon, MI (US)

(72) Inventors: Johnnie Eugene Lehman, Osceola, IN (US); Gary Anthony Lehman, Vicksburg, MI (US); Robert Daniel Slack, White Pigeon, MI (US)

(73) Assignee: Quadra Manufacturing, Inc., White Pigeon, MI (US)

( * ) Notice: Subject to any disclaimer, the term of this patent is extended or adjusted under 35 U.S.C. 154(b) by 0 days.

(21) Appl. No.: 15/703,228

(22) Filed: Sep. 13, 2017

(65) Prior Publication Data

US 2018/0072279 A1    Mar. 15, 2018

Related U.S. Application Data

(60) Provisional application No. 62/394,900, filed on Sep. 15, 2016.

(51) Int. Cl.
| | | |
|---|---|---|
| *B60S 9/02* | (2006.01) | |
| *B60S 9/22* | (2006.01) | |
| *B62D 65/16* | (2006.01) | |
| *B60S 9/08* | (2006.01) | |

(52) U.S. Cl.
CPC .  *B60S 9/22* (2013.01); *B60S 9/02* (2013.01); *B60S 9/08* (2013.01); *B62D 65/16* (2013.01)

(58) Field of Classification Search
CPC ...... B60S 9/00; B60S 9/02; B60S 9/08; B60S 9/12; B60S 9/22; B60S 9/04; B60S 9/06; B60S 9/10
See application file for complete search history.

(56) References Cited

U.S. PATENT DOCUMENTS

| | | | |
|---|---|---|---|
| 1,548,182 A | | 8/1925 | Burgin |
| 1,809,579 A | | 6/1931 | Bryant et al. |
| 1,893,848 A | | 1/1933 | Stevenson et al. |
| 2,002,428 A | | 5/1935 | Black |
| 2,037,298 A | | 4/1936 | Anderson |
| 2,046,918 A | | 7/1936 | Kruse |
| 2,571,067 A | | 10/1951 | Seckendorf |
| 2,747,836 A | * | 5/1956 | Sherman ................... B60S 9/04  254/122 |
| 3,454,251 A | * | 7/1969 | Dye .......................... B60S 9/04  248/354.5 |

(Continued)

OTHER PUBLICATIONS

U.S. Appl. No. 16/140,230, Office Action dated Sep. 18, 2019.

*Primary Examiner* — James M Dolak
(74) *Attorney, Agent, or Firm* — Larry E. Henneman, Jr.; Henneman & Associates, PLC

(57) ABSTRACT

A vehicle leveling system includes a jack adapted to be mounted to a vehicle frame without modifying the vehicle frame. In a particular embodiment, the jack includes a first bracket adapted to urge against the bottom surface of the frame and a second bracket adapted to be mounted to a surface of the vehicle adjacent the frame. In a more particular embodiment, the first bracket includes a horizontal adjustment feature and the second bracket includes a vertical adjustment feature. In another particular embodiment, the jack is coupled to the vehicle frame via a bracket that is adapted to be mounted to manufacturer-provided apertures formed in the frame during the manufacture of the vehicle.

18 Claims, 16 Drawing Sheets

(56) References Cited

U.S. PATENT DOCUMENTS

| | | | |
|---|---|---|---|
| 3,733,051 A | 5/1973 | Bollinger | |
| 3,758,074 A * | 9/1973 | Jeffries | B60P 3/32 254/45 |
| 3,760,906 A | 9/1973 | McGee | |
| 3,857,582 A * | 12/1974 | Hartog | B60S 9/02 280/764.1 |
| 3,879,055 A * | 4/1975 | Sill | B60S 9/02 254/106 |
| 4,061,309 A | 12/1977 | Hanser | |
| 4,084,789 A * | 4/1978 | Francis | B60S 9/04 254/418 |
| 4,165,861 A | 8/1979 | Hanser | |
| 4,216,939 A | 8/1980 | Valdespino | |
| 4,415,182 A * | 11/1983 | Smith-Williams | B60S 9/16 248/352 |
| 4,597,584 A | 7/1986 | Hanser | |
| 4,623,125 A | 11/1986 | Ebey | |
| 4,743,037 A | 5/1988 | Hanser | |
| 4,746,133 A | 5/1988 | Hanser et al. | |
| 5,141,197 A * | 8/1992 | Mackaay | B60P 3/32 248/188.5 |
| 5,727,767 A * | 3/1998 | Jefrey | B60S 9/22 248/354.3 |
| 6,142,488 A * | 11/2000 | Orr | B60P 3/36 280/6.153 |
| 6,145,813 A * | 11/2000 | Anderson | B60S 9/08 254/418 |
| 6,726,247 B1 * | 4/2004 | Snyder | B60S 9/04 254/45 |
| 8,181,937 B2 | 5/2012 | Schwindaman et al. | |
| RE43,535 E * | 7/2012 | Roll | B60D 1/66 254/418 |
| 8,550,486 B2 * | 10/2013 | Scott | B60D 1/247 280/455.1 |
| 8,690,128 B1 | 4/2014 | Schwindaman et al. | |
| 9,073,516 B2 | 7/2015 | Schwindaman et al. | |
| 9,156,441 B2 | 10/2015 | Tiedge | |
| 9,573,796 B1 * | 2/2017 | Ceravolo | F16M 11/26 |
| 9,656,637 B2 * | 5/2017 | Kimener | B60S 9/08 |
| 9,809,072 B2 * | 11/2017 | Beck | B60D 1/66 |
| 10,308,228 B2 | 6/2019 | Roider | |
| 10,315,628 B2 | 6/2019 | Raymond, Sr. | |
| 10,496,123 B1 * | 12/2019 | Palermo, Jr. | B60S 9/00 |
| 10,556,572 B2 * | 2/2020 | Sun | B60S 9/12 |
| 10,569,748 B2 * | 2/2020 | Jones | B60S 9/22 |
| 10,625,716 B2 * | 4/2020 | Jones | B60S 9/04 |
| 2002/0100901 A1 | 8/2002 | Topelberg et al. | |

\* cited by examiner

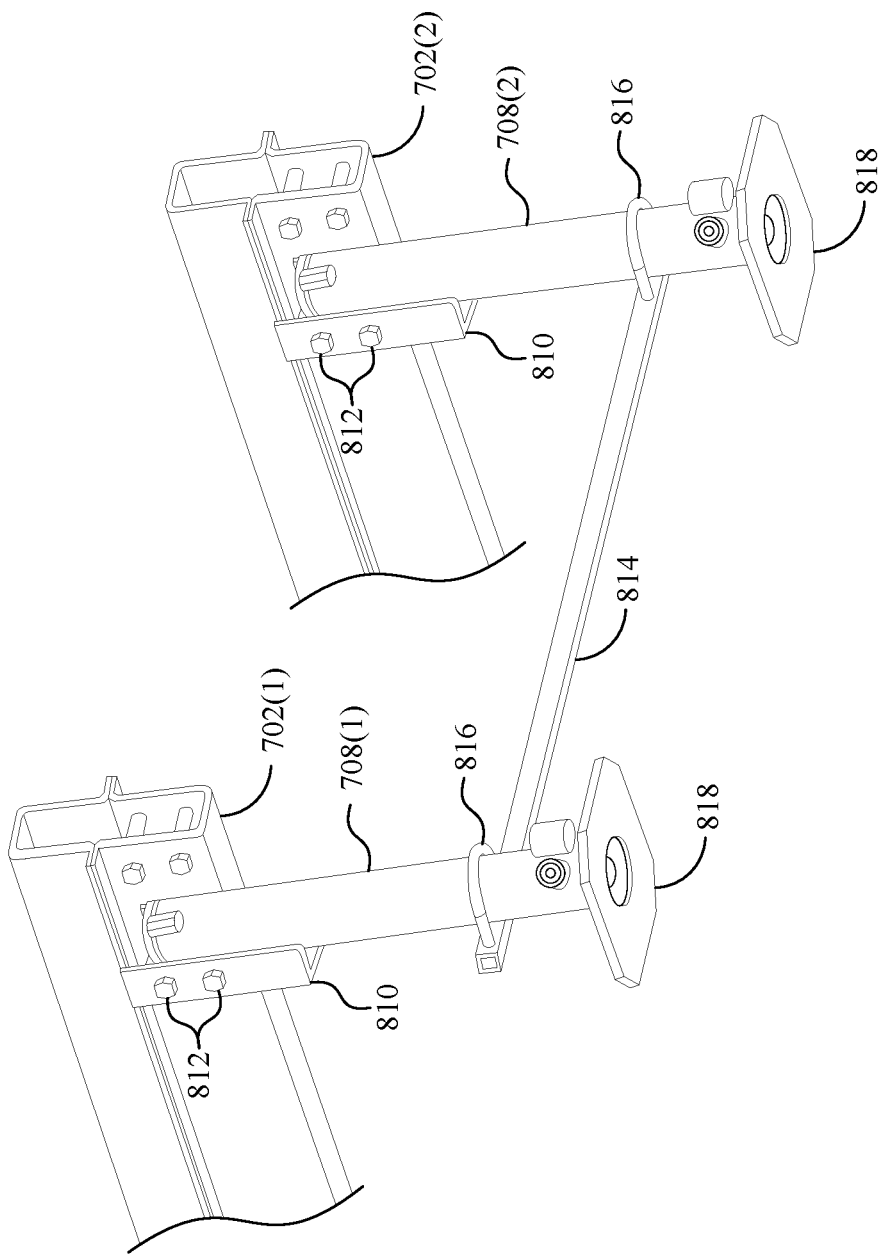

ATTACHABLE LEVELING SYSTEM

CROSS-REFERENCE TO RELATED APPLICATIONS

This application claims the benefit of U.S. Provisional Patent Application Ser. No. 62/394,900, filed Sep. 15, 2016 by the same inventors, which is incorporated herein by reference in its entirety.

BACKGROUND OF THE INVENTION

Field of the Invention

This invention relates generally to leveling systems for vehicles, and more particularly to attachable leveling systems configured for jacking a vehicle frame.

Description of the Background Art

Recreational vehicles (RVs) are popular for travel and camping. Increasingly, non-recreational utility vehicles are being converted into RVs. For example, the Mercedes Benz Sprinter 3500 is a cargo van, typically used for commercial applications, which is a popular vehicle for RV conversion. When converting general-use vehicles to an RV, it often becomes necessary to consider a leveling system for the vehicle, because most general-use vehicles do not come equipped with one.

Sometimes stand-alone jacks are placed under a converted RV to lift the RV for leveling purposes. This is disadvantageous, however, because the jacks need to be stored (e.g., in a vehicle compartment) when not in use and some work is required to place and extend the jacks for leveling. One solution to these problems is to drill holes into the frame of the vehicle and attach jack(s) using these newly-drilled holes. Unfortunately, this solution is also disadvantageous, because drilling into "no-drill zones" in the frame can void a manufacturer's warranty and/or create a safety hazard, for example, by weakening the frame.

SUMMARY

The present invention overcomes the problems associated with the prior art by providing a vehicle leveling system adapted to be mounted to a vehicle without permanently modifying the vehicle's frame.

The vehicle leveling system includes a first jack and a frame engaging feature. The first jack is extendable between a stowed position and a deployed position and includes an upper region and a lower region. The first frame engaging feature is coupled to the upper region of the first jack and is adapted to engage a frame of the vehicle without permanently modifying the vehicle's frame.

In a particular embodiment, the first frame engaging feature includes a first frame engaging bracket adapted to urge against a bottom surface of the frame when the first jack is in the deployed position. In a more particular embodiment, the first frame engaging feature includes a first horizontal adjustment feature facilitating horizontal adjustment of a fixed horizontal position of the first frame engaging bracket with respect to the first jack. Even more particularly, the first frame engaging feature further includes a second frame engaging bracket and a second horizontal adjustment feature. The second frame engaging bracket is adapted to urge against the bottom surface of the frame when the first jack is in the deployed position, and the second horizontal adjustment feature facilitates horizontal adjustment of a fixed horizontal position of the second frame engaging bracket with respect to the first jack. In a specific example, the first and/or second horizontal adjustment feature includes a horizontal elongated slot and a bolt, the horizontal elongated slot is formed in the associated frame engaging bracket, and the bolt is disposed in the horizontal elongated slot and is horizontally fixed with respect to the first jack. In another more particular embodiment, the first and/or second frame engaging bracket includes a lip adapted to engage a side wall of the vehicle frame.

In another particular embodiment, the leveling system further comprises a mounting structure coupled to the upper region of the first jack. The mounting structure is adapted to be mounted to a surface of the vehicle adjacent the frame and is further adapted to vertically support the weight of the first jack when the first jack is in the stowed position. In a more particular embodiment, the mounting structure includes a vertical adjustment feature facilitating vertical adjustment of a fixed vertical position of the first frame engaging feature with respect to the mounting structure. In an even more particular embodiment, the mounting structure includes at least one bracket, and the vertical adjustment feature includes a vertical elongated slot and a bolt. The bracket is adapted to be fixably mounted to the surface of the vehicle adjacent the frame. Additionally, the vertical elongated slot is formed in the bracket, and the bolt is disposed in the vertical elongated slot and is vertically fixed with respect to the first jack. In another particular embodiment, the vertical adjustment feature includes a first bracket and a second bracket, where each of the first and second brackets is adapted to be fixably mounted to the surface of the vehicle adjacent the frame. Additionally, the first bracket and the second bracket are each vertically adjustable with respect to the first jack, and the first bracket and the second bracket are independently adjustable. The surface of the vehicle adjacent the frame can be a floor of the vehicle, for example of the passenger cabin. Optionally, the floor can be a portion of a uni-body.

In another embodiment, the leveling system further includes a second jack and a second frame engaging feature. The second jack is extendable between a stowed position and a deployed position and includes an upper region and a lower region. The second frame engaging feature is coupled to the upper region of the second jack and is adapted to engage the frame of the vehicle without permanently modifying the frame. In a more particular embodiment, the vehicle leveling system further includes a cross-member having a first end and a second end, where the first end is coupled to the first jack and the second end is coupled to the second jack.

In yet another particular embodiment, the vehicle leveling system further includes a bracket fixably coupled to the first jack and defining a first aperture and a second aperture. The first aperture is disposed to be coaxially aligned with a first manufacturer-provided aperture in a vehicle frame when the second aperture is coaxially aligned with a second manufacturer-provided aperture in the vehicle frame. In a more particular embodiment, the vehicle leveling system further includes a first bolt and a second bolt. The first bolt is adapted to be simultaneously disposed through the first aperture of the bracket and the first manufacturer-provided aperture in the vehicle frame. Similarly, the second bolt is adapted to be simultaneously disposed through the second aperture of the bracket and the second manufacturer-provided aperture in the vehicle frame. In another more particular embodiment, the vehicle leveling system further includes a second jack extendable between a stowed position and a deployed position. The second jack includes a bracket fixably coupled to the second jack, and the bracket of the second jack defines a first aperture and a second aperture. The first aperture of the bracket of the second jack is disposed to be coaxially aligned with a third manufacturer-provided aperture in the vehicle frame when the second aperture of the bracket of the second jack is coaxially aligned with a fourth manufacturer-provided aperture in the vehicle frame. In an even more particular embodiment, the vehicle leveling system includes a cross-member having a first end coupled to the first jack and a second end coupled to the second jack.

In another embodiment, a vehicle leveling system includes a first jack, a first bracket, a second bracket, a second jack, a third bracket, a fourth bracket, and a cross-member. The first bracket is coupled to the first jack and is adapted to urge against a bottom surface of a vehicle frame when the first jack is in a deployed position. The first bracket includes a horizontal adjustment feature for horizontally adjusting the fixed horizontal position of the first bracket with respect to the first jack. The second bracket is coupled to the first jack and is adapted to mount to a surface of the vehicle adjacent the vehicle frame. The second bracket includes a vertical adjustment feature for vertically adjusting the fixed vertical position of the second bracket with respect to the first jack. The third bracket is coupled to the second jack and is also adapted to urge against a bottom surface of the vehicle frame when the second jack is in a deployed position. The third bracket includes a horizontal adjustment feature for horizontally adjusting the fixed horizontal position of the third bracket with respect to the second jack. The fourth bracket is coupled to the second jack and is adapted to mount to a surface of the vehicle adjacent the vehicle frame. The fourth bracket includes a vertical adjustment feature for vertically adjusting the fixed vertical position of the fourth bracket with respect to the second jack. The cross-member is fixably coupled to the first jack and the second jack.

A method for attaching a jack to a vehicle is also disclosed. The method includes the steps of providing a jack having a first set of support features (e.g., a first set of brackets) and a second set of support features (e.g., a second set of brackets) adjustably mounted thereto, mounting the first set of support features to a surface (e.g., a floor) of the vehicle adjacent a frame of the vehicle, positioning the second set of support features under the frame, lifting the jack such that the second set of support features engages an underside of the frame, and securing the jack in position relative to the frame and to the surface of the vehicle (e.g., by securing the first and the second sets of support features to the jack and securing the first set of support features to the surface of the vehicle).

Another method for attaching a jack to a vehicle includes the steps of providing a jack having a first frame engaging feature and a second frame engaging feature; aligning the jack with the frame such that the first frame engaging feature is aligned with a first manufacturer-provided feature of the frame and the second frame engaging feature is aligned with a second manufacturer-provided feature of the frame, securing the first frame engaging feature to the first manufacturer-provided feature, and securing the second frame engaging feature to the second manufacturer-provided feature. Optionally, this method can be used to attach a second jack to a vehicle in combination with the method described in the prior paragraph.

A system configured to couple a jack to a vehicle without altering a frame of the vehicle is also disclosed. The system includes a first set of support features (e.g., a first set of brackets, etc.) and a second set of support features (e.g., a second set of brackets, etc.). The first set of brackets is configured to be coupled to a jack and to be affixed to a surface of the vehicle adjacent the frame. The second set of brackets is configured to be coupled to the jack and to abut a bottom surface of the frame so as to be able to exert a lifting force on the frame when the jack is actuated.

In a particular embodiment, the system further includes an intermediate structure (e.g., an intermediate bracket, such as a U-bracket, etc.) configured to be affixed to the jack.

Additionally, each of the first set of brackets and the second set of brackets is configured to be adjustably attached to the intermediate bracket.

In another particular embodiment, each bracket of the first set of brackets includes an elongated fastening region to facilitate generally vertical adjustment of the bracket of the first set with respect to the jack. Still more particularly, the elongated fastening region comprises a set of slotted holes formed in the bracket of the first set of brackets.

In still another particular embodiment, each bracket of the second set of brackets includes a lip extending upward with respect to a bottom surface of the bracket of the second set. The lip prevents the frame from moving laterally with respect to the jack when the jack is actuated. In a more specific example, each bracket of the second set of brackets is a J-shaped bracket. In another more particular embodiment, each bracket of the second set of brackets includes an elongated fastening region (e.g., a set of slotted holes formed in the bracket, etc.) to facilitate generally horizontal adjustment of the bracket with respect to the jack.

A system for attaching a jack to a vehicle frame having manufacturer-provided features is also described. The system includes an intermediate structure and a set of fasteners. The intermediate structure (e.g., a bracket, a U-bracket, etc.) defines a set of apertures therethrough and is configured to be affixed to a jack. The apertures of the intermediate structure are disposed at locations corresponding to locations of the manufacturer-provided features (e.g., apertures) in the frame. Each fastener (e.g., bolt) in the set of fasteners is configured to be disposed simultaneously through at least one of the apertures in the intermediate bracket and through at least one of the manufacturer-provided apertures, whereby the intermediate bracket will be disposed adjacent the frame of the vehicle when installed. Additionally, when the system in installed on the jack and the frame and the jack is actuated, a lifting force is transferred from the jack to the frame via the intermediate structure and the set of fasteners.

A jack system for providing a vehicle with leveling capability is also described. The system includes a set of front jacks, a first set of front brackets, a second set of front brackets, a set of rear jacks, a set of rear brackets, and a set of rear fasteners. Each bracket of the first set is configured to couple to one of the front jacks and to a surface of the vehicle adjacent its frame. Each bracket of the second set is configured to couple to one of the front jacks and to engage a bottom surface of the vehicle's frame. Additionally, each rear bracket is configured to be fixed to one of the rear jacks and includes a set of apertures that are disposed to coaxially align with a set of manufacturer-provided apertures formed in the frame. The set of rear fasteners is configured to attach the set of rear brackets adjacent to the frame via the set of manufacturer-provided holes. When the system is installed and the jacks are actuated, each bracket of the second set of front brackets exerts an upward force on the frame, and each of the rear brackets exerts an upward force on the frame via the set of rear fasteners and the set of manufacturer-provided apertures.

BRIEF DESCRIPTION OF THE DRAWINGS

The present invention is described with reference to the following drawings, wherein like reference numbers denote substantially similar elements:

FIG. 8C is a perspective view of the jacks of FIG. 7 installed on the frame without a frame extension;

DETAILED DESCRIPTION

The present invention overcomes the problems associated with the prior art, by providing leveling jacks and a method of installing such leveling jacks onto a vehicle, without drilling new holes into the frame of the vehicle or otherwise permanently modifying the vehicle frame, particularly in "no-drill" zones. In the following description, numerous specific details are set forth (e.g., bracket types, vehicle type/layout, etc.) in order to provide a thorough understanding of the invention. Those skilled in the art will recognize, however, that the invention may be practiced apart from these specific details. In other instances, details of well-known leveling practices (e.g., jack placement, synchronization, power, etc.) and components (e.g., hydraulic systems, etc.) have been omitted, so as not to unnecessarily obscure the present invention.

Figure 1:
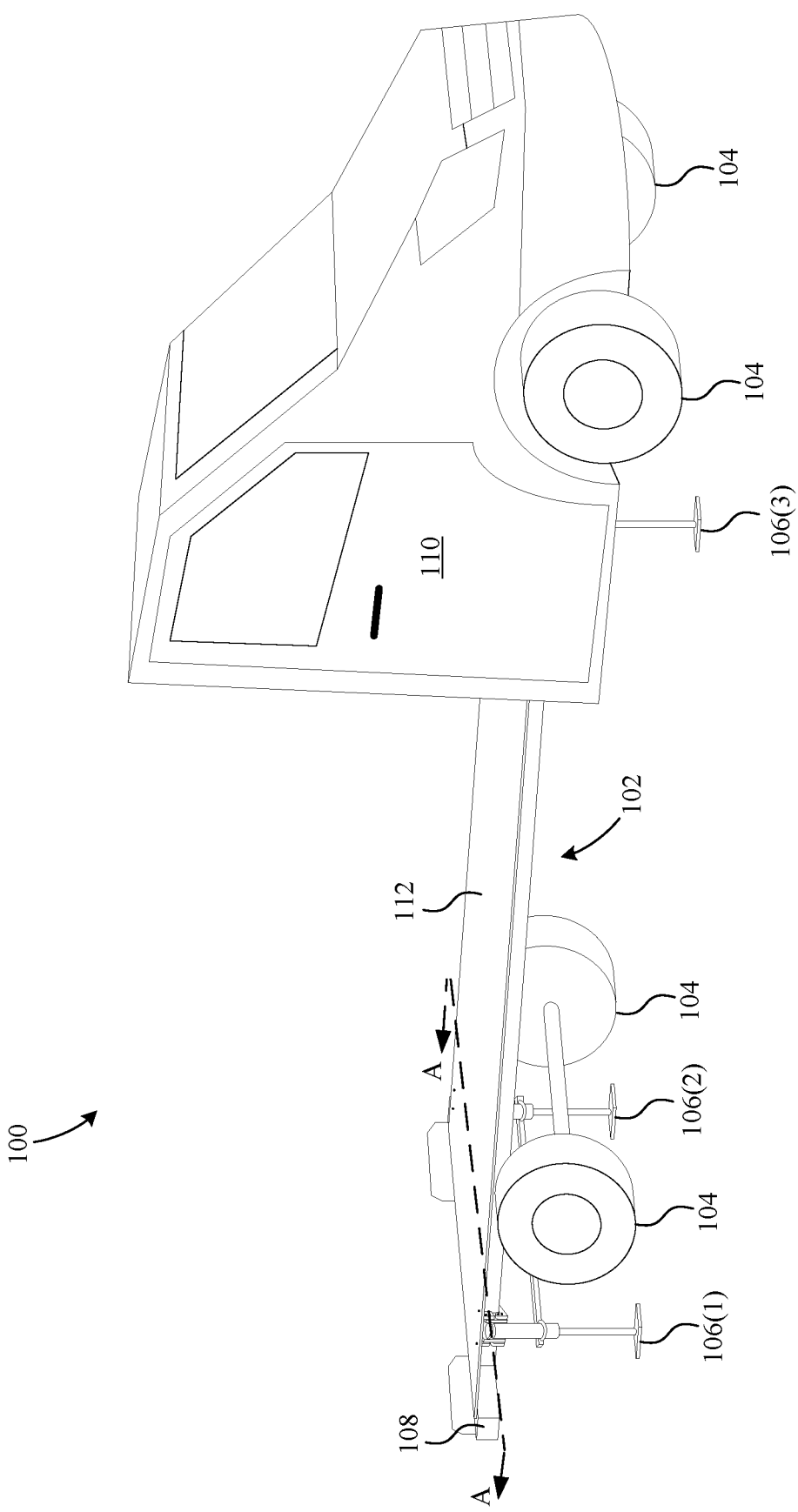
FIG. 1 is a perspective view of an exemplary utility vehicle including an attachable leveling system according to one embodiment the present invention.

FIG. 1 is a perspective view of a utility vehicle 100 of the type that is commonly converted into a recreational vehicle (RV). Utility vehicle 100 includes a frame 102 (e.g., frame rails, cross members, etc.), a set of wheels 104, a plurality of leveling jacks 106, and a frame attachment 108. In the present embodiment, utility vehicle 100 includes four leveling jacks 106(1-4), where the fourth jack 106(4) is hidden from view by front passenger-side wheel 104. Frame attachment 108 represents a bumper, a frame and/or cargo extender, etc. that is attached to frame 102.

Utility vehicle 100 also includes a passenger cabin 110 and a floor 112, which are coupled to frame 102. In some embodiments, cabin 110 and/or floor 112 might be separate components mounted onto frame 102 in a "body-on-frame" configuration, whereas in the case of "uni-body" structures, cabin 110 and/or floor 112 can be formed integrally with the members (e.g., frame rails, cross-members, etc.) of frame 102. Frame 102 can have both "no-drill" and "drill-permitted" zones, where drilling through a "no-drill" zone would void a manufacturer's warranty and/or create a safety issue. Commonly "no-drill" zones include frame rails and cross-members of frame 102, whereas floor 112 and/or passenger cabin 110 typically include "drill-permitted" zones (e.g., those areas not located over frame rails, cross members, etc.) that can be drilled through without voiding a warranty or creating a safety hazard.

In FIG. 1, floor 112 is shown representationally as a "drill-permitted zone" and might be, for example, the floor of an RV living space, the floor of a cargo van, a truck bed, etc. coupled to frame 102. In the following examples, floor 112 will be described as part of a uni-body frame 102. However, the invention applies equally if floor 112 is a bolt-on component in the body-on-frame configuration. Thus, utility vehicle 100 represents any vehicle that would benefit from an attachable leveling system, such as a cargo van, a pickup truck, a semi truck, a tractor-trailer combination, a trailer, etc. where modifying "no-drill" zones is a concern.

Oftentimes, it is necessary for the structures (e.g., a recreational cabin, cargo cabin, etc.) coupled to frame 102 of vehicle 100 to be leveled for proper use when parked. While wheels 104 are level enough for driving purposes, the attached structures may not sit level when parked on uneven terrain. To provide further leveling, leveling jacks 106(1-4) (only 3 shown) are installed onto frame 102 and can be independently actuated to raise or lower associated portions of utility vehicle 100. As will be discussed below, leveling jacks 106 couple to vehicle 100 in ways that do not require new holes to be drilled in a "no-drill" zone of frame 102 and that do not create safety concerns.

Figure 2:
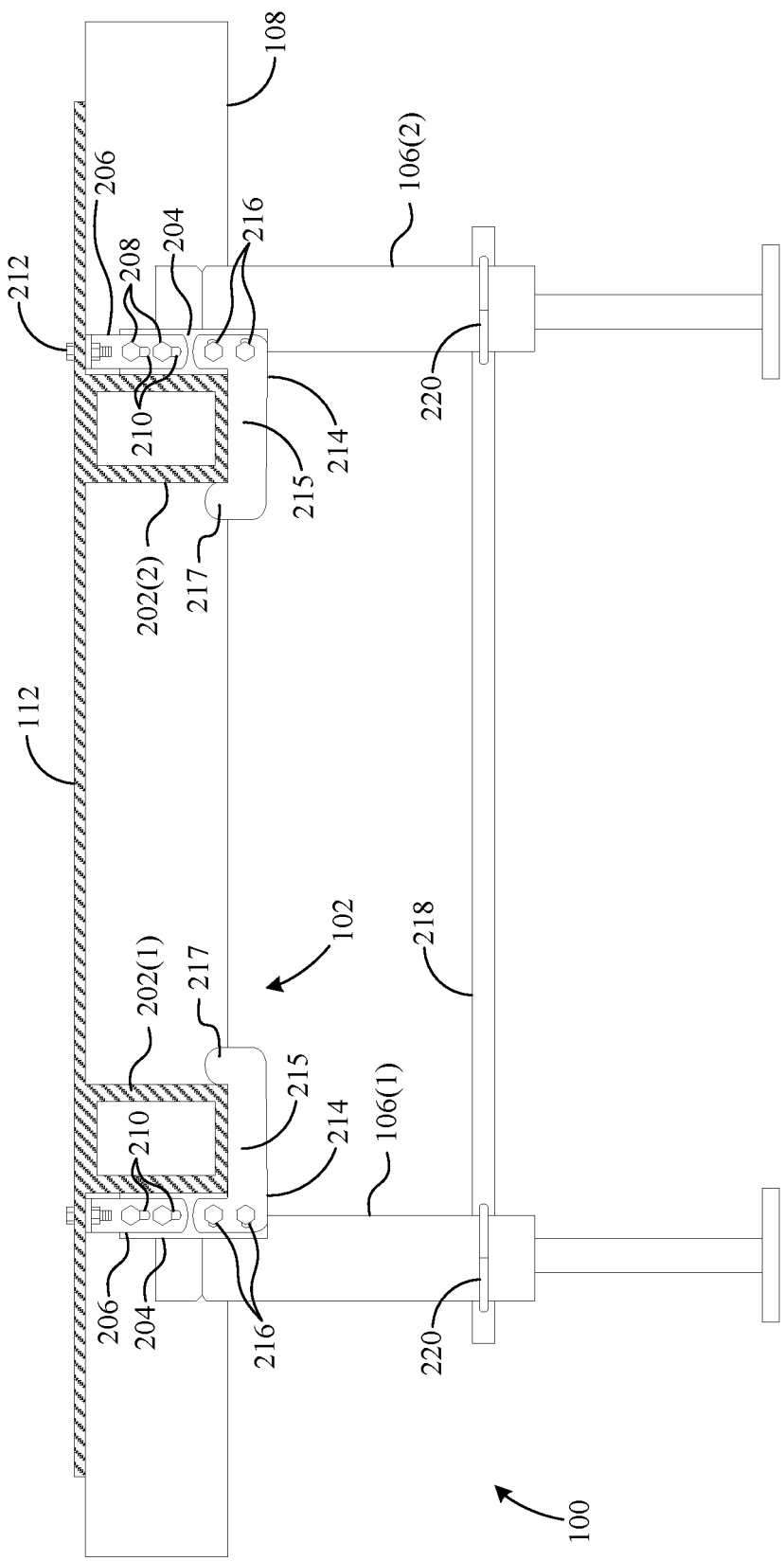
FIG. 2 is a cross-sectional view of the utility vehicle of FIG. 1 taken along line A-A.

FIG. 2 shows the rear end of utility vehicle 100 sectioned along line A-A of FIG. 1. As shown, leveling jacks 106(1-2) are attached to floor 112 adjacent respective frame rails 202(1-2) of frame 102. Here, floor 112 is integrated with frame 102 in a uni-body configuration, but in other embodiments, floor 112 can be associated with any body-on-frame component that attaches (e.g., with bolts, etc.) to one or more of frame rail(s) 202(1-2).

In the example embodiment, each of jacks 106(1-2) is fixed (e.g. by welding, etc.) to a respective upright member, which in this non-limiting example embodiment is a U-bracket 204. A pair of L-brackets 206 is adjustably attached to each U-bracket 204 by a set of fasteners (e.g., bolts, etc.) 208 disposed through a plurality of vertically elongated (slotted) holes 210, which function as a vertical adjustment feature. Slotted holes 210 allow jacks 106 to be fixed to a slanted portion of vehicle 100 (e.g., a slanted portion of cabin 110 or floor 112, etc.) as will be discussed below. L-brackets 206 are mounting structures which, in this example, are mounted to floor 112 via fasteners 212 (e.g., bolts, etc.) to anchor the bracket assembly. Unlike frame rails 202(1-2) which are "no-drill" zones, drilling through floor 112 adjacent the frame rails 202(1-2) is permitted and, therefore, will not void a manufacturer's warranty or create a safety concern.

Each U-bracket 204 also has a pair of J-brackets 214 coupled thereto, which function as frame engaging features. Each of J-brackets 214 is adjustably attached a respective one of U-brackets 204 via a respective set of fasteners (bolts) 216. The J-brackets 214 associated with a particular leveling jack 106 are positioned beneath an associated frame rail 202 and, therefore, function as frame engaging features that engage the lower surface of the associated frame rail 202. In particular, as shown in FIG. 2, each J-bracket 214 includes a horizontal member 215 and an upright member 217. Together, U-bracket 204, horizontal member 215 and upright member 217 define a space for receiving a portion of vehicle frame 202. Accordingly, J-brackets 214 are designed to withstand a jacking force sufficient to lift vehicle 100. When a leveling jack 106 is extended to meet the ground, an upward force is transferred from the jack 106 to an associated frame rail 202 via the jack's U-bracket 204 and J-brackets 214, thereby lifting frame 102 via the frame rail 202. Because J-brackets 214 are positioned snugly against frame-rails 202 during installation, very minimal (if any) jacking force is exerted directly on floor 112.

FIG. 2 also shows that a cross-member 218 can be attached between adjacent jacks 106, which helps brace and stabilize the jacks 106 when lifting frame 102. Cross-member 218 is coupled to each of jacks 106 by a U-bolt 220. Those skilled in the art will recognize that this particular element (as well as other described elements, even if not explicitly stated) is not an essential element of the present invention. For example, the present invention may be practiced without cross-member 218. In other embodiments, cross-member 218 can be mounted against/coupled to other structures of utility vehicle 100, such as a transmission cross-member, an axle, etc. to provide stability.

Figure 3:
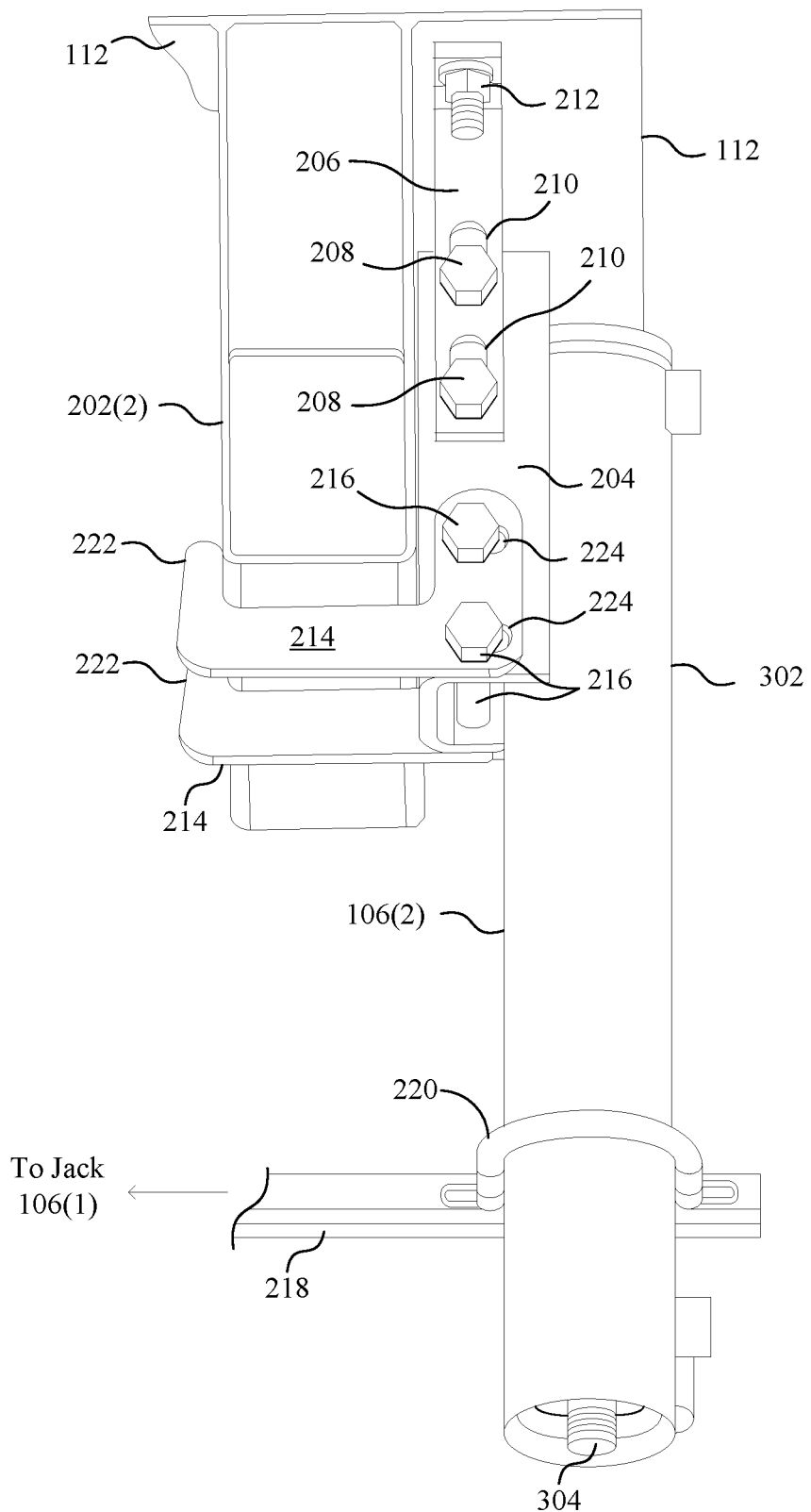
FIG. 3 is a perspective view of one of the installed leveling jacks of FIG. 2.

FIG. 3 is a perspective view of jack 106(2) attached to floor 112 adjacent frame rail 202(2). Only a portion of frame rail 202(2) and floor 112 are shown for simplicity, and jack 106(2) is tipped backward (into the page) to show more detail. As shown, the cylinder 302 of jack 106(2) resides at least partially within the "U" of U-bracket 204. Additionally, each J-bracket 214 includes a lip 222, which is adapted to engage the far side of frame rail 202(2) and prevents J-brackets 214 from slipping off of frame-rail 202(2) when jack 106 is actuated and/or due to motion of vehicle 100 during travel. Lips 222 also prevent jack from rotating outward from frame rail 202(2) and possibly damaging floor 112 near bolts 212.

FIG. 3 also shows how L-brackets 206 and J-brackets 214 are adjustably mounted to U-bracket 204. Both L-brackets 206 (only one shown) are adjustably mounted to U-bracket 204 by a set of bolts 208 (two in this embodiment), which pass through respective vertical slots 210 formed in each L-bracket 206 and behind jack cylinder 302. Slots 210 enable proper vertical positioning of J-brackets 214 to the underside of frame rail 202(2), even if floor 112 is slanted with respect to the bottom surface of frame rail 202(2). Similarly, both J-brackets 214 are adjustably mounted to U-bolt 204 by a set of bolts 216 (two in this embodiment), which pass through respective horizontal slots 224 formed in each J-bracket 214 and behind jack cylinder 302. Slots 224 facilitate proper horizontal (lateral) positioning of J-brackets 214 to the underside of frame rail 202(2). Slots 224 thus provide a tolerance to compensate for coatings (e.g., paint, rust inhibitor, etc.) applied to frame rail 202(2), the mounting locations of L-brackets 206, etc. Accordingly, slots 210 and 224 function as vertical and horizontal adjustment features, respectively, for mounting jack 106 to vehicle 100.

It should also be noted that jack 106 does not include a ram extension or ground pad in the embodiment shown. As will be apparent, such components can be attached to the threaded end 304 of the jack ram. Additionally, jack 106 can be any jack that is suitable to the application, including one that is driven hydraulically, electronically, and/or manually.

Figure 4:
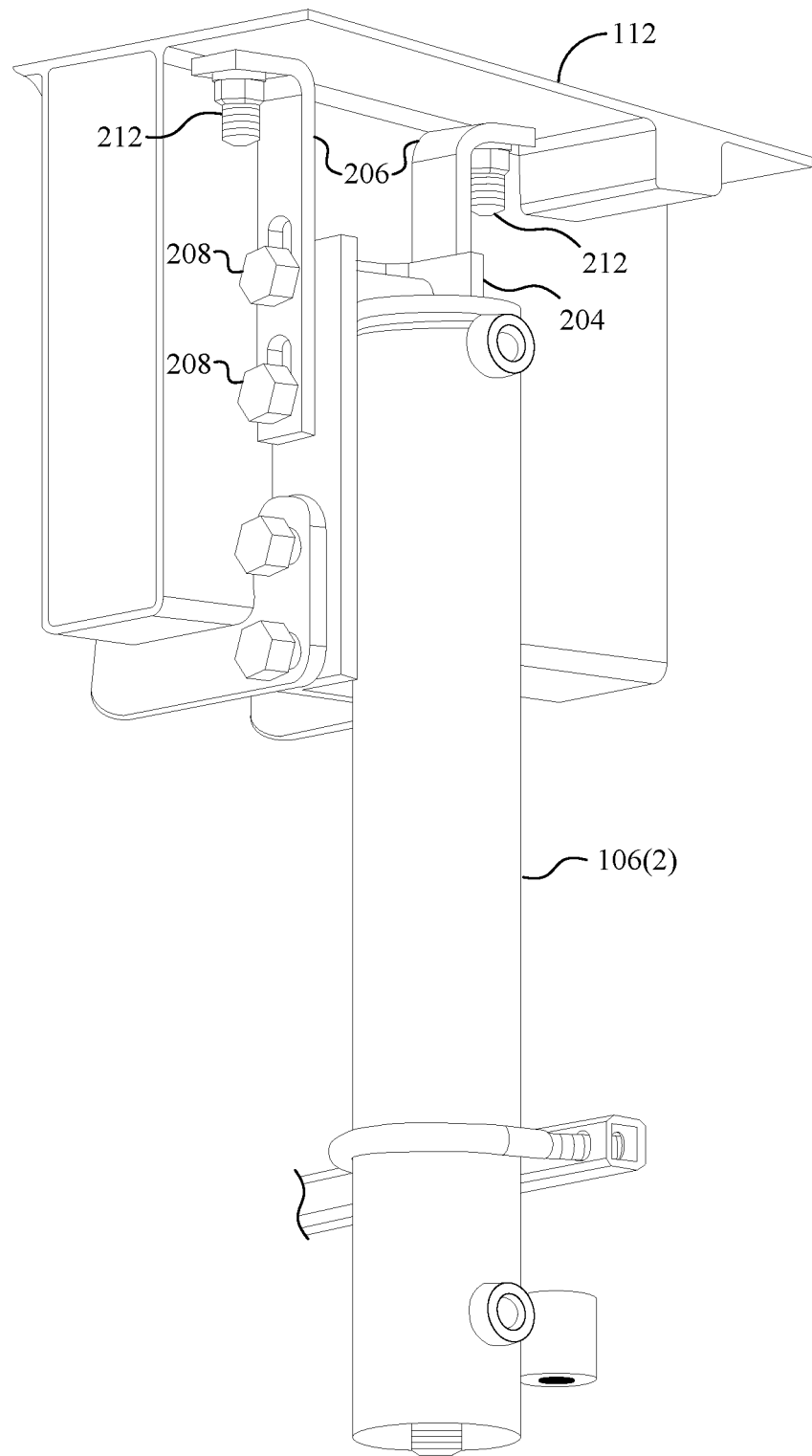
FIG. 4 is another perspective view of the installed leveling jack of FIG. 3.

FIG. 4 is a perspective view showing jack 106(2) from another angle. FIG. 4 shows how U-bracket 204 is attached to floor 112 using two L-brackets 206 and respective bolts 212. Additionally, FIG. 4 shows how each of bolts 208 passes through and secures both of L-brackets 206 to U-bracket 204.

Figure 5:
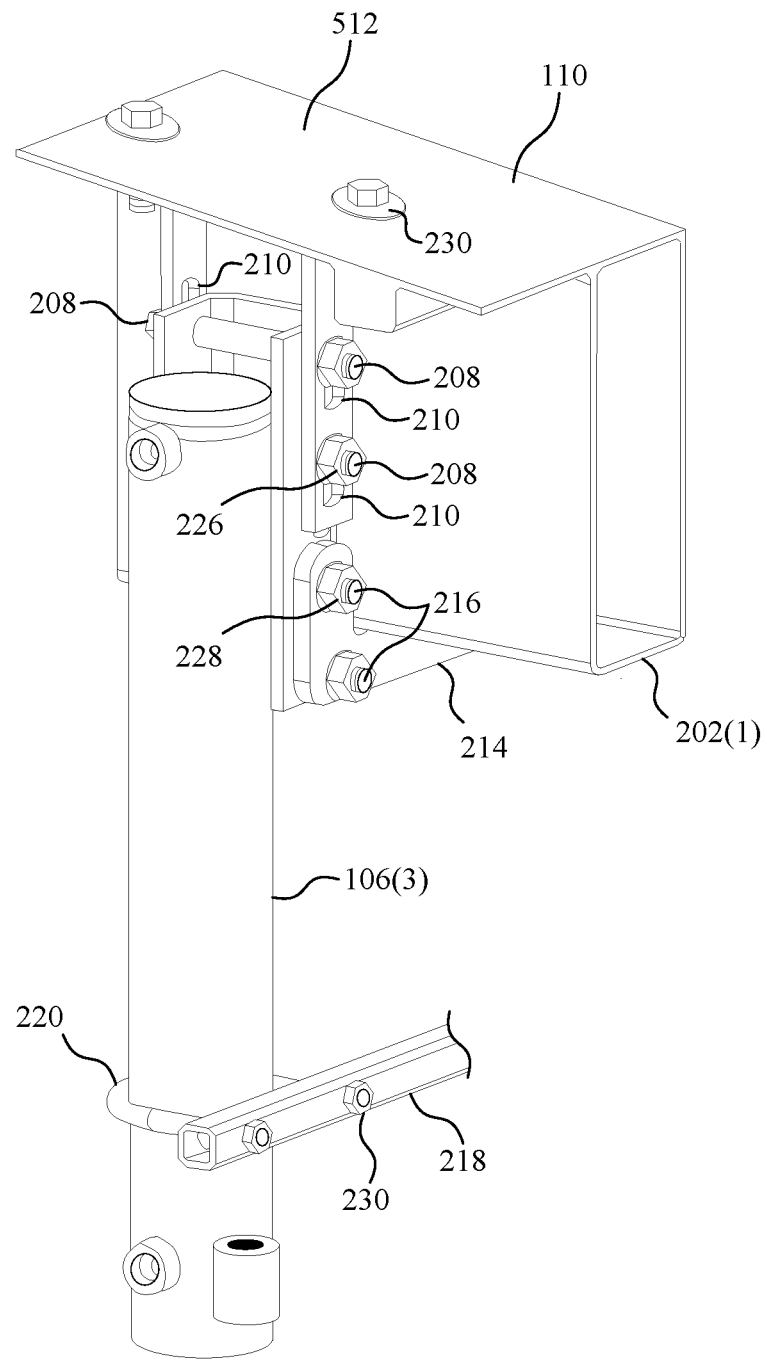
FIG. 5 is a perspective view of one of the leveling jacks of FIG. 1 installed on an angled surface of a utility vehicle.

FIG. 5 shows how a jack 106(3) of the invention can be attached to a slanted floor 512 of the passenger cabin 110 of utility vehicle 100 via the adjustable L-brackets 206. (Only a portion of floor 512 and frame rail 202(1) are shown for simplicity.) Like floor 112, floor 512 and frame rails 202(1-2) of frame 102 are configured as a uni-body. Alternatively, the slanted floor 512 can be part of a body-on-frame passenger cabin.

As shown, the floor 512 has a slight pitch from front to back with respect to the bottom surface of frame rail 202(1). On the near (right) side of jack 106(3), the slotted holes 210 are positioned lower on bolts 208. However, on the far (left) side of jack 106, the slotted holes 210 are positioned higher on bolts 208. This difference in positioning illustrates that, although jack 106(3) is fixed to a slanted surface, jack 106(3) can still be positioned perpendicularly with respect to the ground, and the J-brackets 214 can be positioned tight to the bottom of frame rail 202(1). FIG. 5 also illustrates that the sets of bolts 208 and 216 are secured by respective sets of nuts 226 and 228. Like jacks 106(1-2), a cross-member 218 can optionally be attached between the front set of jacks 106(3-4) using U-bolts 220 and associated nuts 230 for additional stability. In the embodiment of FIG. 1, jack 106(4) near the driver-side front wheel is attached to vehicle 100 substantially similarly as jack 106(3).

Figure 6:
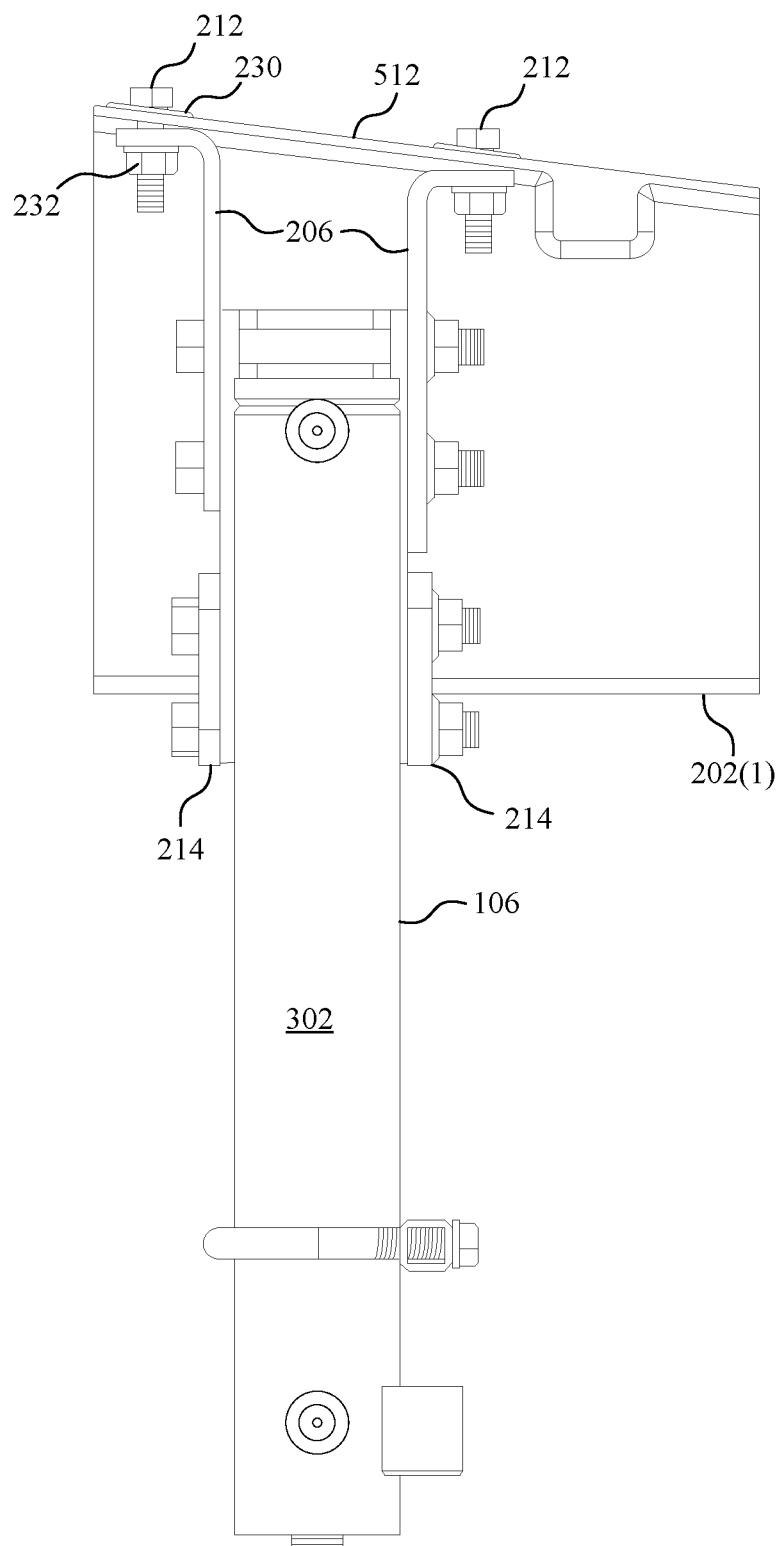
FIG. 6 is a side view of the leveling jack of FIG. 5 installed on the angled surface.

FIG. 6 is a side view showing jack 106(3) of FIG. 5. FIG. 6 better shows the slant of floor 512 in comparison to the vertical orientation of jack 106(3) and the horizontal bottom surface of frame rail 202(1). Like jacks 106(1-2), when jack 106(3) is in a stowed position, the weight of jack 106(3) is carried by L-brackets 206, which are secured to cabin floor 512 via bolts 212 and nuts 232. Washers 230 can be used between the bolts 212 and the floor 512 (or floor 112) to distribute the weight of the jack 106 if desirable. Like floor 112, drilling through floor 512 is permitted by the manufacturer in areas adjacent frame rail 202(1) and, therefore, doing so does not constitute drilling through a "no-drill" zone in frame 102, which could void a manufacturer's warranty and/or create a safety concern.

A method for installing each of jacks 106(1-4) will now be described. First, the jack 106 is installed to the floor (e.g., the floor 512 of the passenger cabin, etc.) of the vehicle 100 by drilling holes through the floor and, optionally, painting over the holes to prevent premature breakdown (e.g., rusting) of exposed metal. Then, the jack 106 is loosely secured to the floor by positioning fasteners 212 through the floor and L-brackets 206. Jack 106 is positioned so that the J-brackets 214, which have been attached to U-bracket 204, are positioned under the desired portion of the frame (e.g., under an associated frame rail 202) and the cylinder 302 of jack 106 is straight in all directions (e.g., front-to-back, left-to-right, etc.). Additionally, J-brackets 214 can be horizontally (laterally) adjusted (via slots 224) so that lip 222 engages the far side of the frame rail 202. Then, jack 106 is lifted (e.g., with a separate floor jack, with jack 106 itself, etc.) so as to lift the vehicle 100 (or at least apply some lifting force to the vehicle 100) via the J-brackets 214 and frame 102. The fasteners 210, 216, and 212 are then tightened to desired torque specification(s). Optionally, the fasteners 212 can be tightened after the fasteners 210 and 216. Once jack is secured in a fixed position with respect to frame, vehicle 100 can be lowered. If jack 106 is not in the correct position, the above procedure can be repeated. The above procedure is performed for all jacks 106 being attached to vehicle 100.

Figure 7:
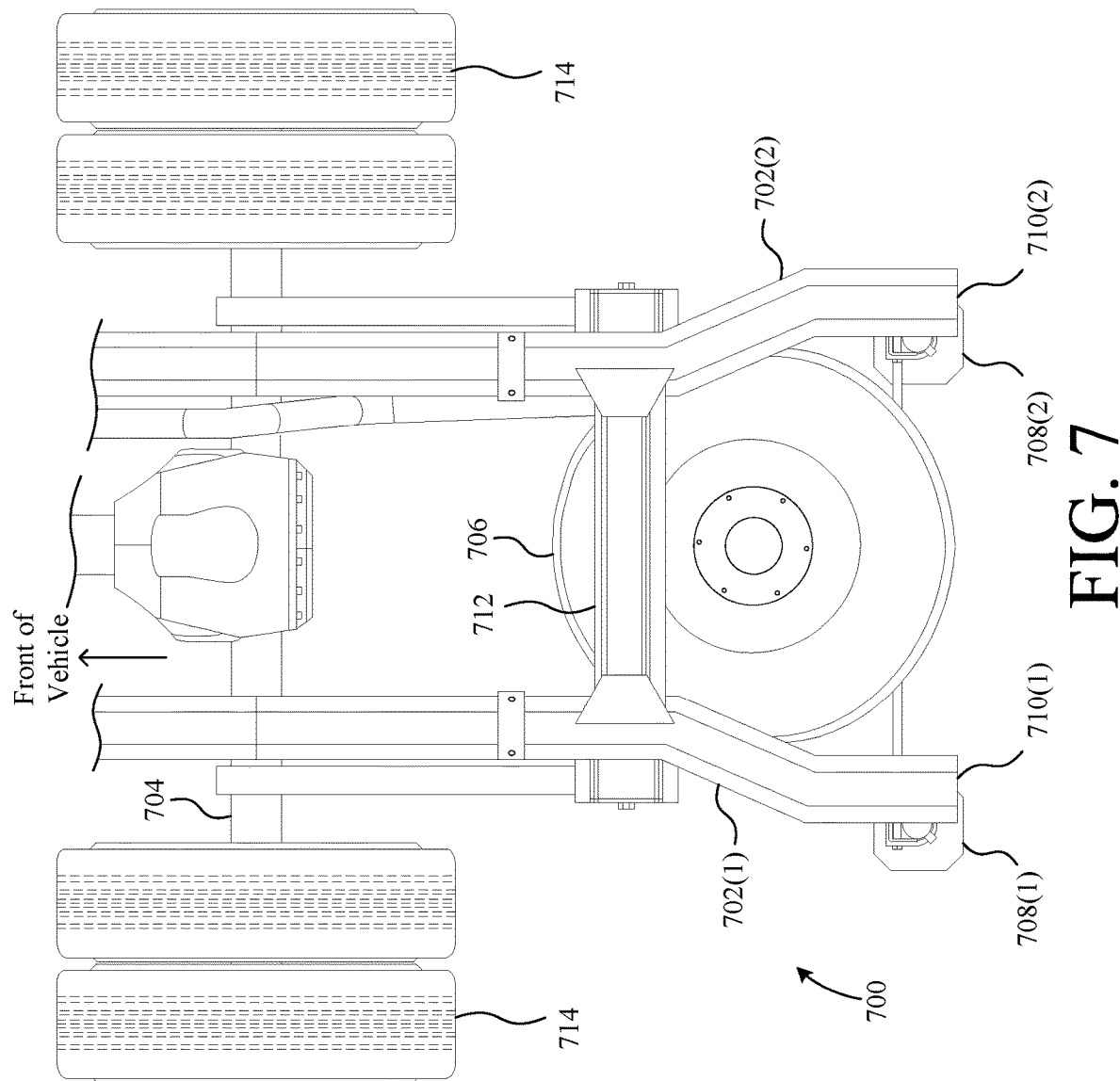
FIG. 7 is a top view of a set of leveling jacks installed on a frame of a utility vehicle according to another embodiment of the present invention.

FIG. 7 is a top view of a rear portion of a frame, including two frame rails 702(1-2) and a cross-member 712, of an alternative utility vehicle 700. Vehicle 700 is also shown to include a rear axle 704, a spare tire 706, and a plurality of wheels 714 coupled to rear axle 704. A plurality of jacks 708(1-2), in accordance with another embodiment of the invention, are attached to the frame near the ends 710(1-2) of respective frame rails 702(1-2). As shown, jacks 708 (1-2) are located behind the rear axle 704, whereas the transmission and engine would be located forward of the rear axle 704, toward the front of vehicle 700. Additionally, jack 708(1) is placed near the outer side of frame rail 702(1), whereas jack 708(2) is placed near the inner side of frame rail 702(2). However, jacks 708(1-2) can be placed on either side of frame rails 702(1-2) as desired depending on the particular application (e.g., to avoid interfering with other components installed near the frame rails 702, etc.).

Figure 8A:
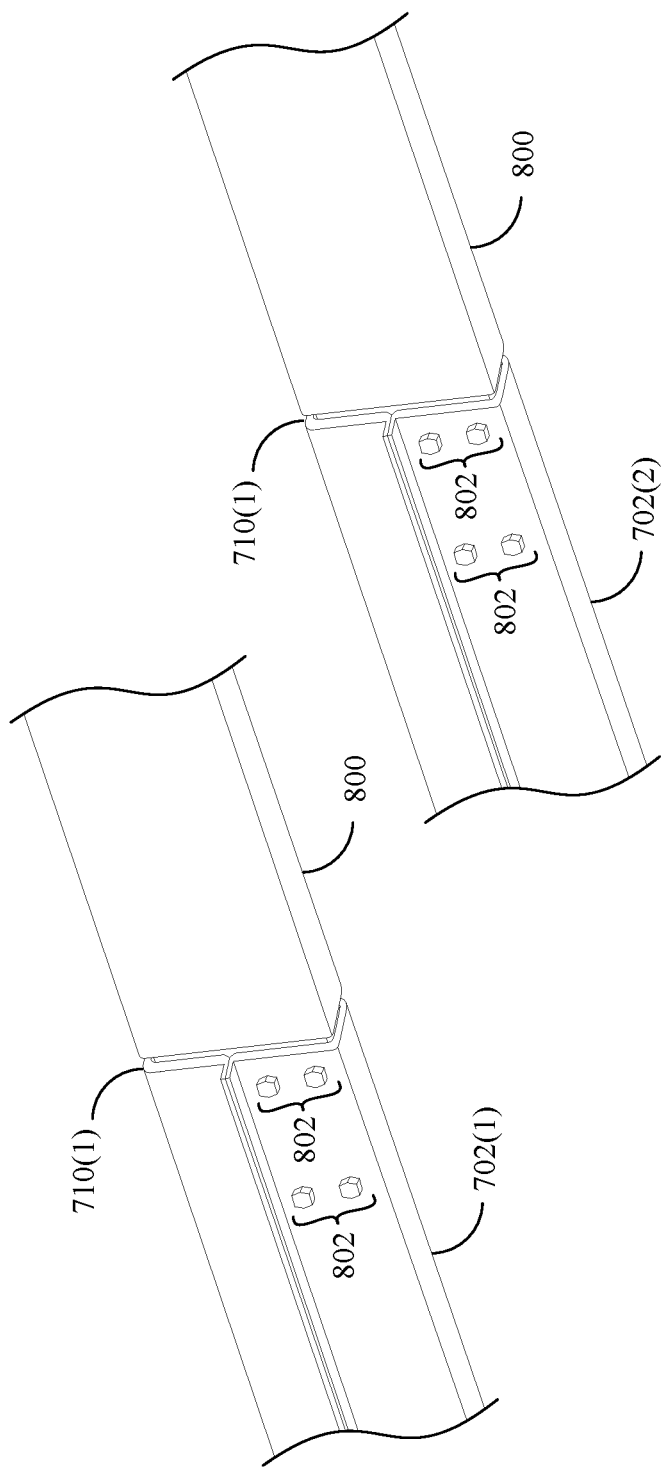
FIG. 8A is a perspective view of a frame extension attached to the frame of the utility vehicle of FIG. 7.

FIG. 8A shows a perspective view of the ends 710(1-2) of frame rails 702(1-2) having a frame attachment 800 mounted thereto. Frame rails 702(1-2) receive complementary portions (not shown) of frame attachment 800 therein. Frame rails 702(1-2) and frame attachment 800 are affixed together using a set of bolts 802 through the frame rails 702(1-2) and their associated portions of frame attachment 800. Frame attachment 800 can be a bumper, a frame extension, etc.

Figure 8B:
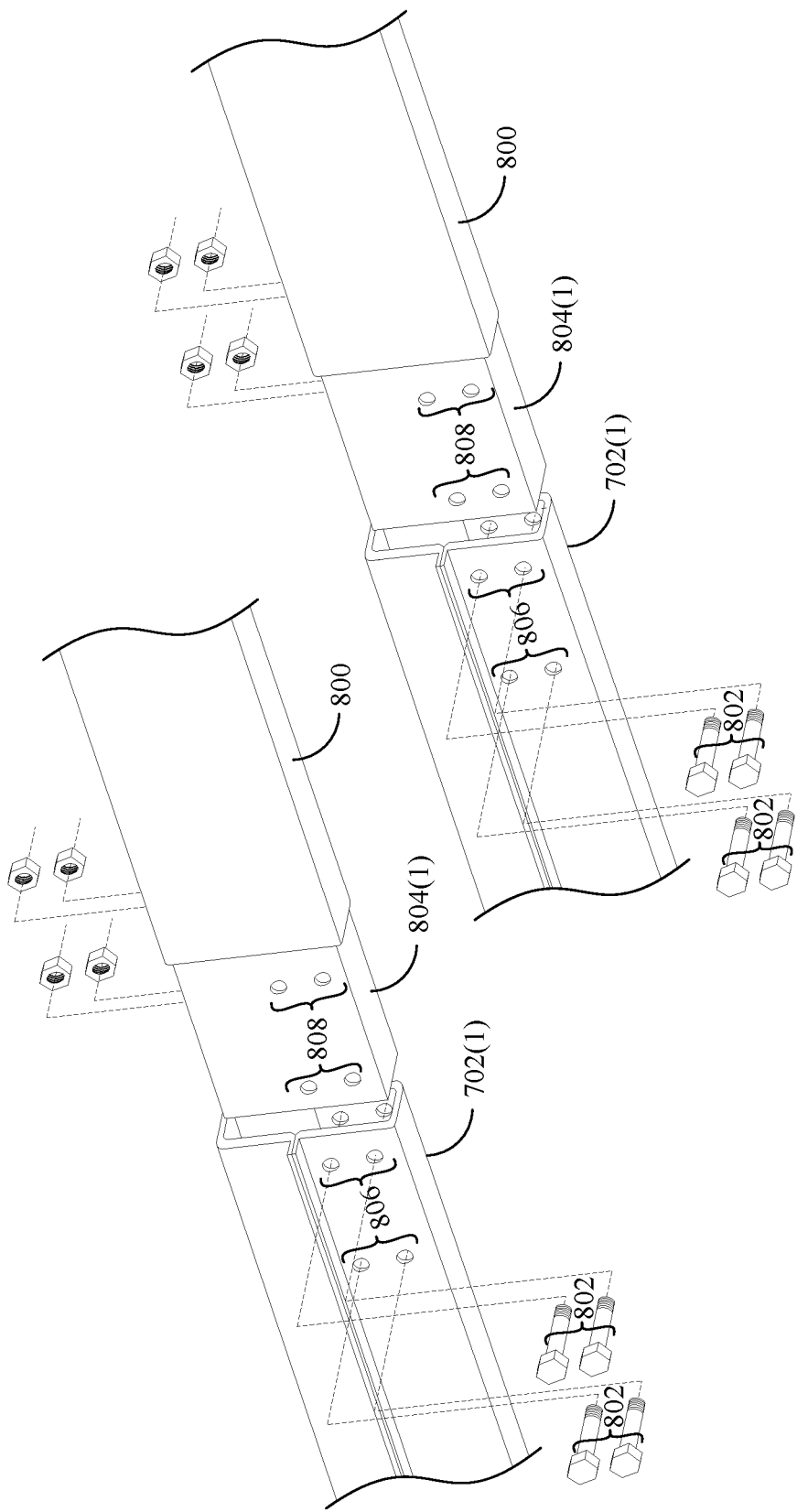
FIG. 8B is a perspective view of the frame extension of FIG. 8A detached from the frame.

FIG. 8B is an exploded perspective view showing the complementary portions 804(1-2) of frame attachment 800 removed from frame rails 702(1-2). As shown, each of frame rails 702(1-2) includes a set of factory apertures 806 (e.g., through-holes made by the manufacturer) formed therein to facilitate the attachment of frame attachment 800. Similarly, each of the complementary portions 804(1-2) of frame attachment 800 also include factory apertures 808. Bolts 802 pass through the respective factory apertures 806 and 808 to attach the frame attachment 800 to frame rails 702(1-2).

FIG. 8C shows frame rails 702(1-2) with jacks 708(1-2) installed via several of the factory apertures 806 (FIG. 8B). Each of jacks 708(1-2) is bolted to a respective one of frame rails 702(1-2) by passing bolts 812 through the associated set of factory apertures 806. Bolts 812 replace the corresponding bolts 802 (FIG. 8A) and are sized to pass through both U-bracket 810 and the associated frame rail 702. Optionally, U-brackets 810 can include additional apertures to be interchangeable with U-bracket 204. Each of jacks 708(1-2) is also coupled to a cross-member 814 via a U-bolt 816 for stabilization while lifting vehicle 700. Additionally, each of jacks 708(1-2) includes a foot pad 818 for dispersing the force applied to the ground when jacks 708(1-2) are actuated.

Because jacks 708(1-2) are attached to frame rails 702 (1-2) using existing apertures 806 in the frame rails 702 formed by the manufacturer, no new apertures need to be created in frame rails 702(1-2). Accordingly, attaching the jacks 708(1-2) does not require permanent frame modifications that would void the manufacturer's warranty and/or create safety concerns (e.g., by weakening the vehicle frame, etc.).

Figure 8D:
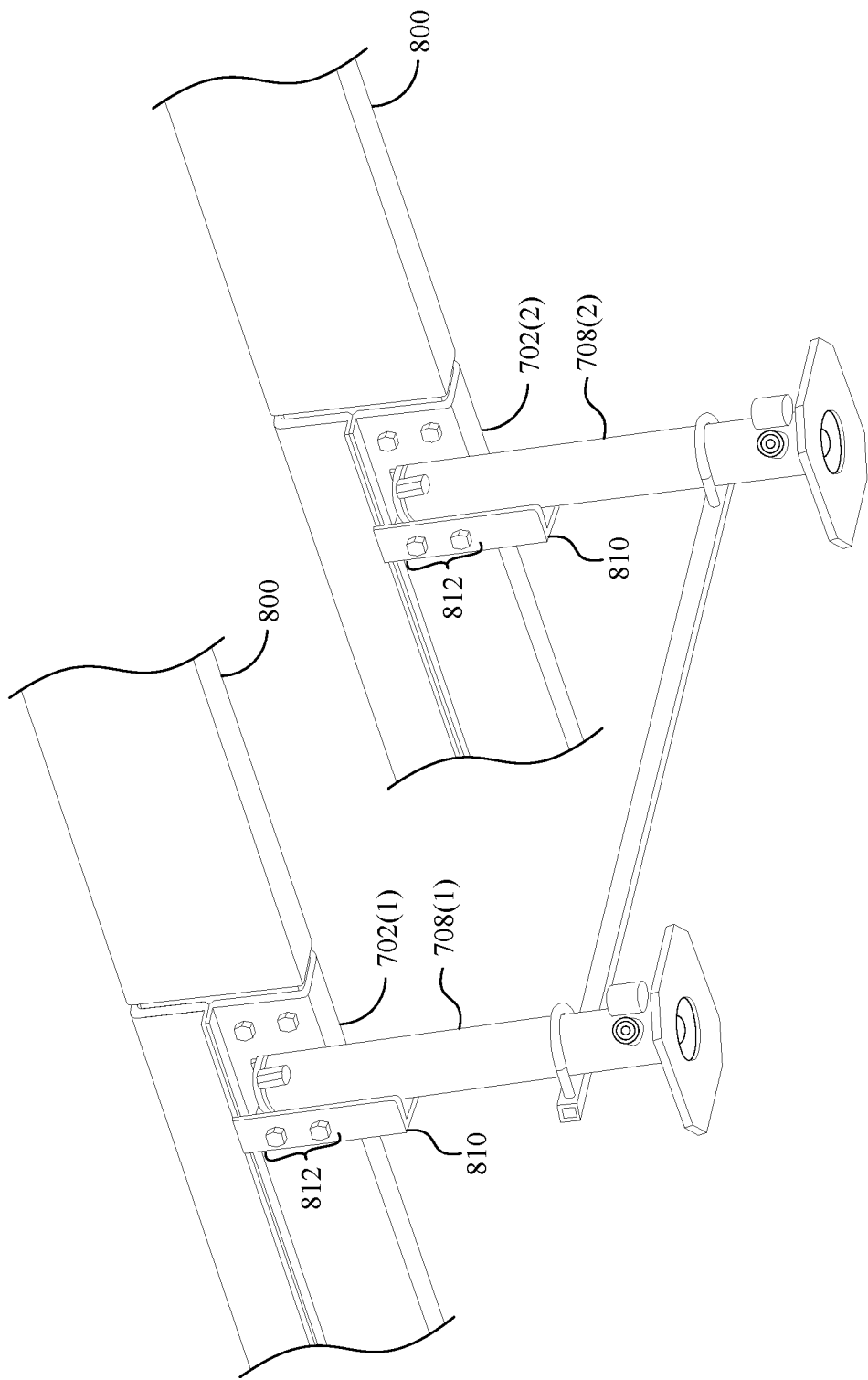
FIG. 8D is a perspective view of the jacks of FIG. 7 installed on the frame along with the frame extension of FIGS. 8A-8B.

FIG. 8D shows frame rails 702(1-2) with both jacks 708(1-2) and frame attachment 800 installed. In this configuration, bolts 812 replace bolts 802 (FIG. 8A) and are sized to couple U-brackets 810 to the respective frame rails 702(1-2). Like above, attaching the jacks 708(1-2) does not require frame modifications that would void the manufacturer's warranty and/or create a safety concern (e.g., by weakening the vehicle frame).

Figure 8E:
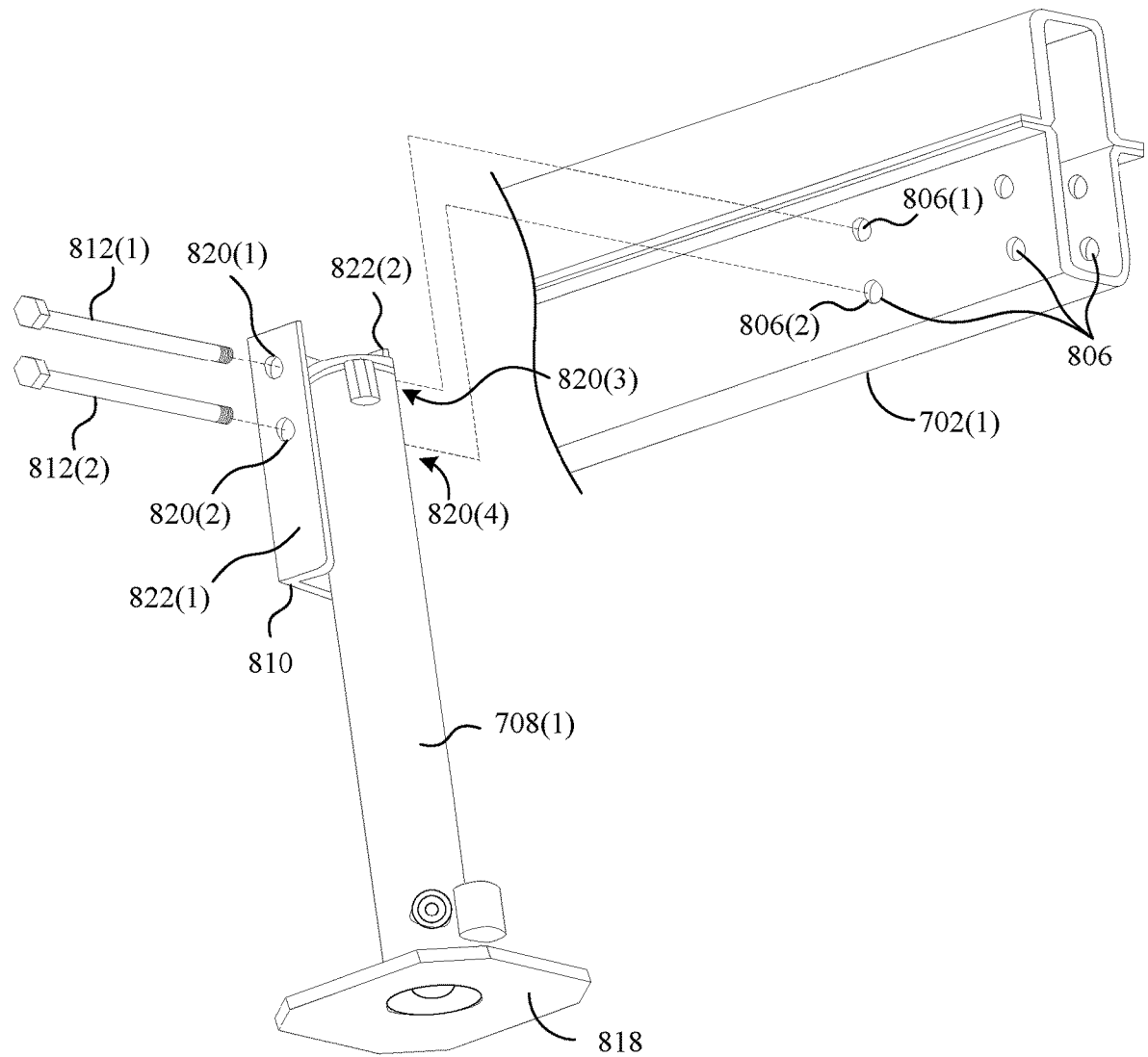
FIG. 8E is a perspective view showing how a jack of FIG. 7 is installed on the frame in greater detail.

FIG. 8E shows how jack 708(1) mounts to frame rail 702(1) via factory apertures 806 in greater detail. In particular, jack 708(1) is fixed to U-bracket 810 (e.g. by welding). A plurality of apertures 820(1-2) are formed through a first arm 822(1) of U-bracket 810, whereas a complementary plurality of apertures 820(3-4) (not shown) are formed through second arm 822(2) of U-bracket 810 in coaxial alignment with apertures 820(1-2). Additionally, when apertures 820(1) and 820(3) are coaxially aligned with a first factory aperture 806(1), then apertures 820(2) and 820(4) can be coaxially aligned with a second factory aperture 806(2). Thereafter, a first bolt 812(1) is passed through apertures 820(1), 820(3), factory aperture 806(1), and a corresponding factory aperture 806 (not shown) that is formed through the far side of frame rail 702 in coaxial alignment with aperture 806(1). Similarly, a second bolt 812(2) is passed through apertures 820(2), 820(4), factory aperture 806(2), and a corresponding factory aperture 806 (not shown) that is formed through the far side of frame rail 702 in coaxial alignment with aperture 806(2). Thereafter, bolts 812(1-2) are secured by nuts on the threaded ends thereof. Jack 708(2) can be mounted to frame rail 702(2) in substantially the same way, after which cross-member 818 can be installed between jacks 708(1-2).

Thus, U-bracket 810, apertures 820, and bolts 812 function as frame engaging features in this embodiment, which engage complementary manufacturer-provided features (e.g., factory apertures 806) on the frame.

Figure 9A:
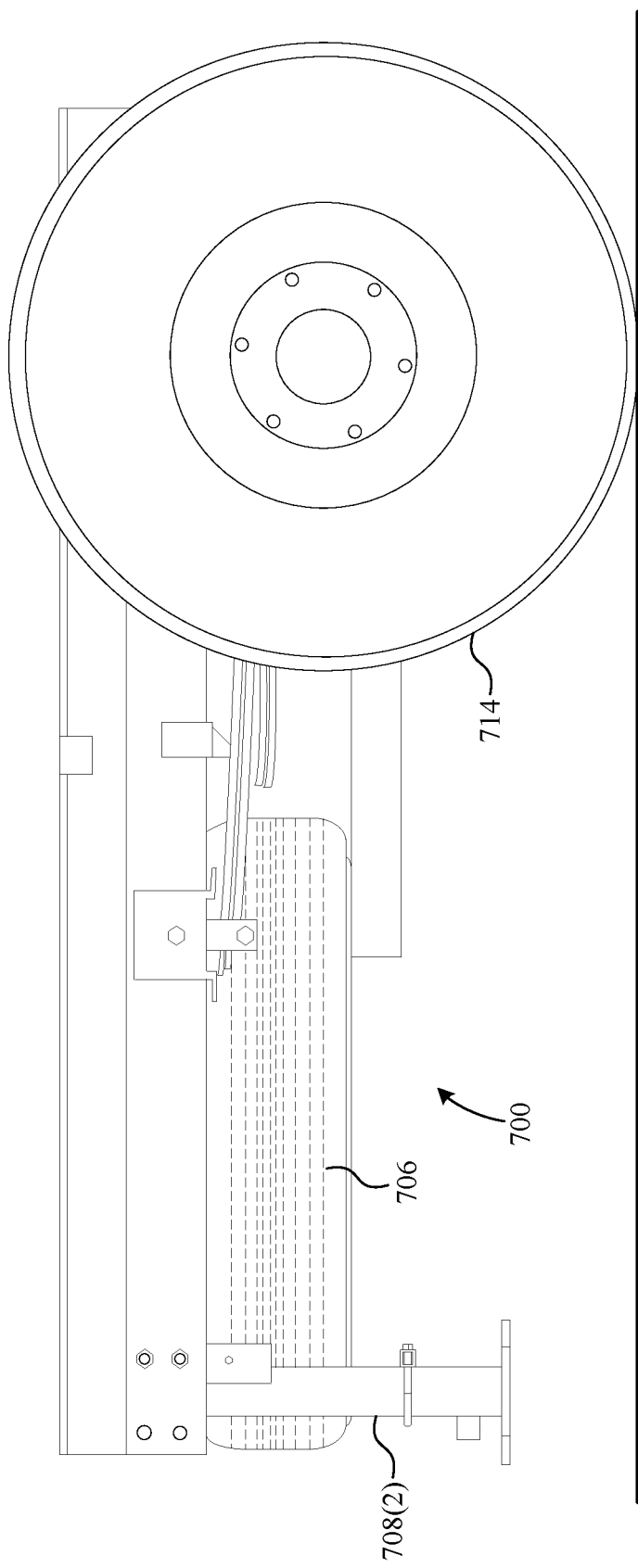
FIG. 9A is a side view of the jacks of FIG. 7 in an unactuated position.

FIG. 9A is a side view of the rear portion of vehicle 700, while jacks 708(1-2) are in a stowed position (only jack 708(2) shown). It should be noted that rear wheels 714 are resting on the ground and there is significant clearance between jacks 708(1-2) and the ground. Additionally, cross-member 814 is disposed sufficiently lower than spare tire 706 to allow for removing spare tire 706 for use without removing jacks 708.

Figure 9B:
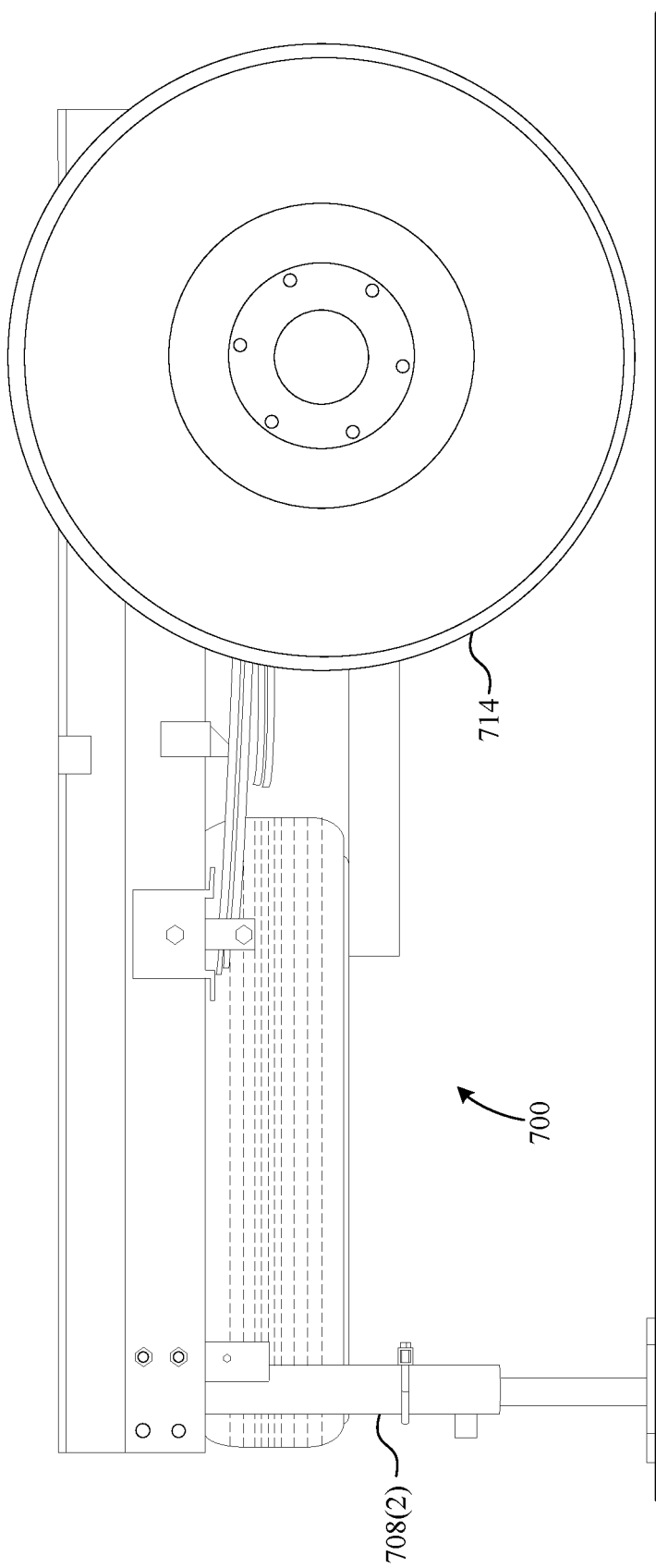
FIG. 9B is a side view of the jacks of FIG. 7 in an actuated position.

FIG. 9B is a side view of the rear portion of vehicle 700, while jacks 708(1-2) are in an deployed position. It should be noted that rear wheels 714 are raised off of the ground, while foot pads 818 of jacks 708(1-2) are pressing on the ground.

Several embodiments of jacks according to the invention have now been described. It will be readily apparent that such embodiments do not have to be used in isolation. For example, the jacks 202 and the jacks 708 can be used on the same vehicle. More particularly, a pair of jacks 202 might be used in the front under the passenger cabin of the vehicle, while a pair of jacks 708 might be attached to the rear of the frame. Additionally, the jacks 202 and 708 can be placed inboard and/or outboard of the frame rails as discussed above as the application requires.

Moreover, while jacks 106 and 708 have been described as assembled units, it should be recognized that U-bracket 204, L-brackets 206, J-brackets 214, and the associated fasteners can be provided as a kit for retrofitting an existing jack, for example, by welding U-bracket 204 thereto. Similarly, U-bracket 810 and fasteners 812 associated with jack 708 can also be provided as a kit to retrofit a jack.

Figure 10:
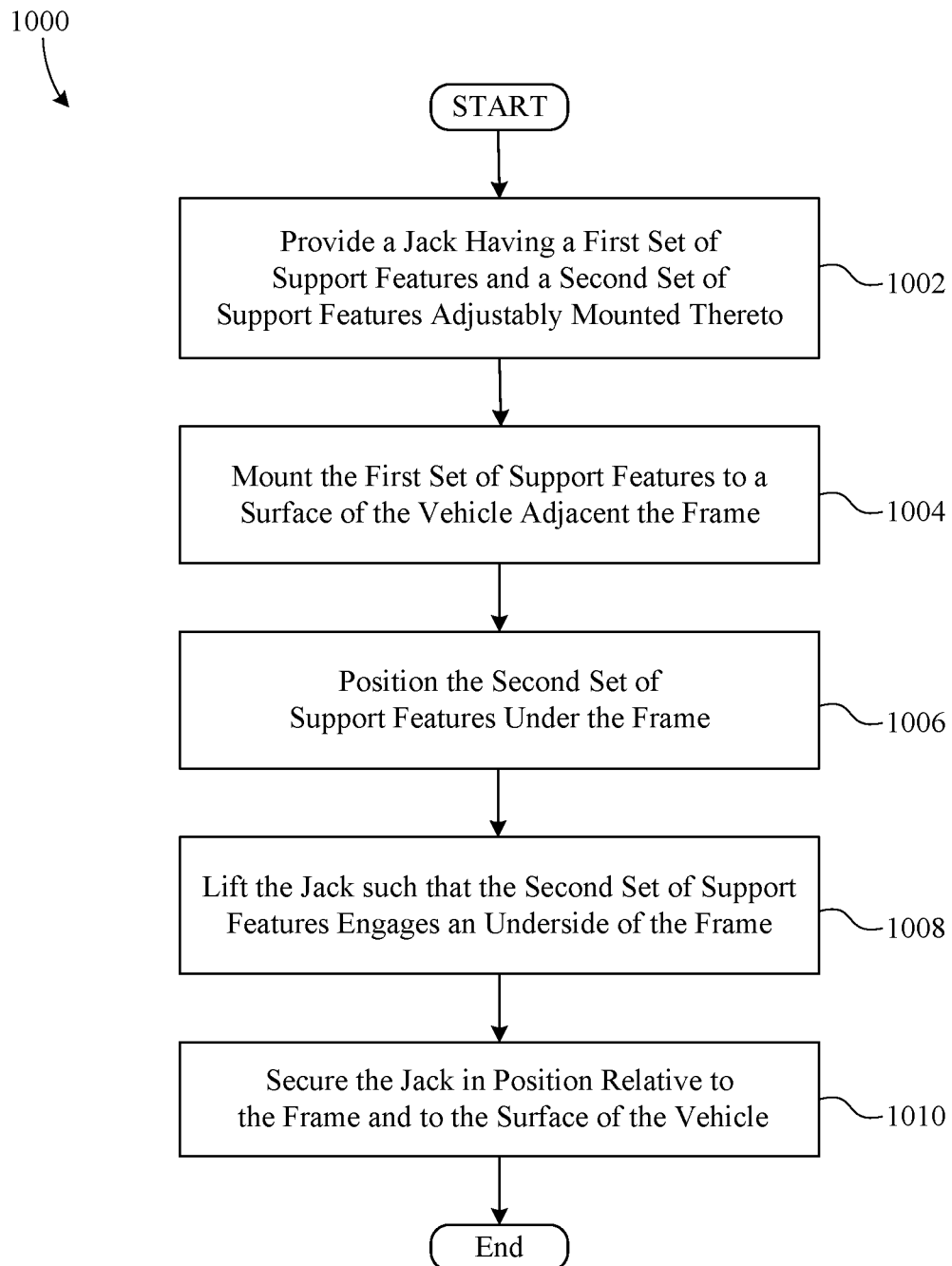
FIG. 10 is a flow-chart summarizing an exemplary method of installing a leveling system on a vehicle frame.

FIG. 10 shows a flowchart summarizing an exemplary method 1000 of mounting a jack of a leveling system to a vehicle according to the invention. In a first step 1002, a jack having a first set of support features (e.g., a first set of brackets, etc.) and a second set of support features (e.g., a second set of brackets, etc.) adjustably mounted thereto is provided. In a second step 1004, the first set of support features are mounted to a surface (e.g., a floor, etc.) of the vehicle adjacent the frame of the vehicle. In a third step 1006, the second set of support features is positioned under the frame, and in a fourth step 1008, the jack is lifted such that the second set of support features engages an underside of the frame. In a fifth step 1010, the jack is secured in position relative to the frame and to the surface of the vehicle, for example, by securing the first and second sets of support features to the jack and securing the first set of support features to the surface of the vehicle.

Figure 11:
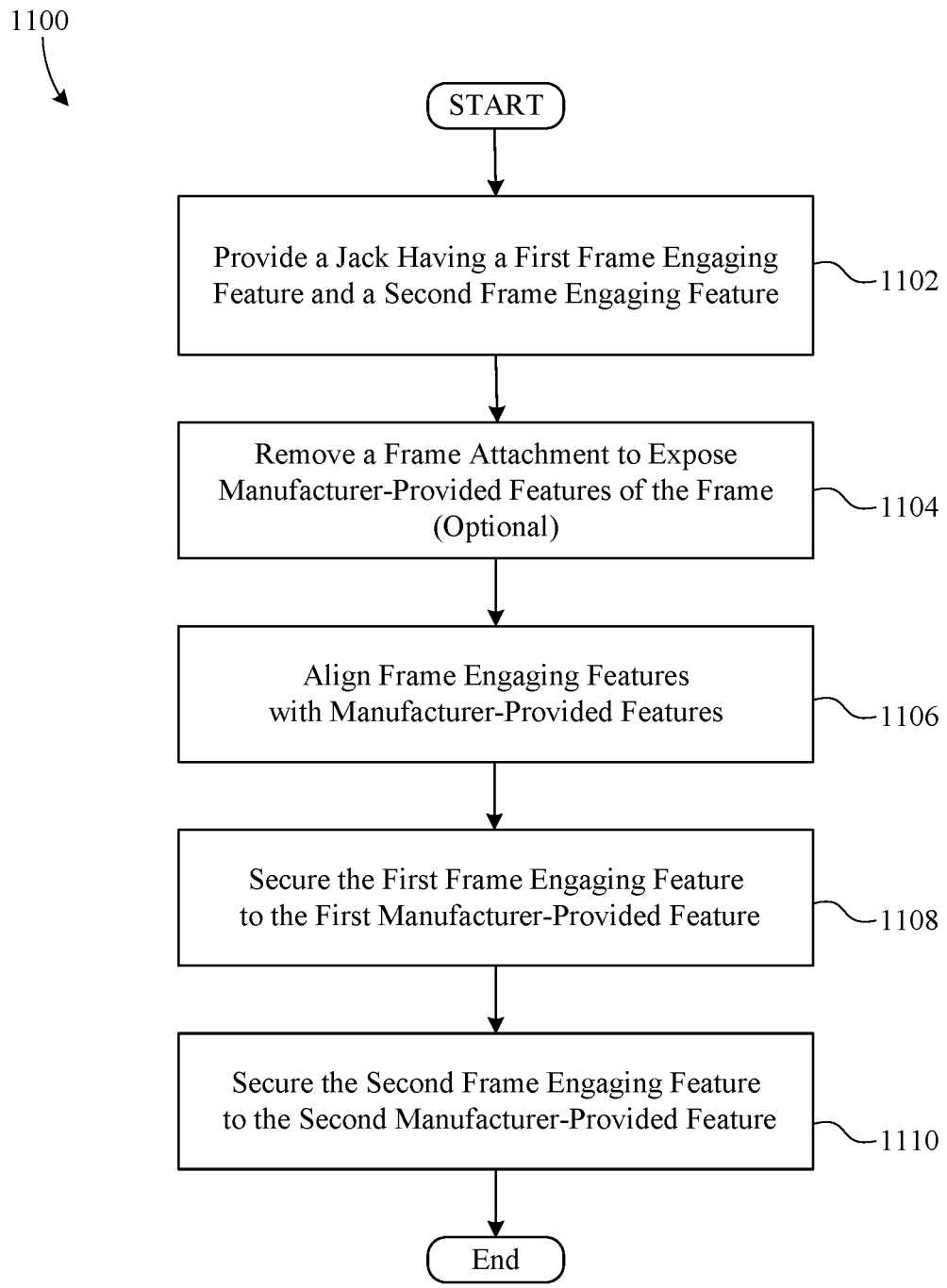
FIG. 11 is a flow-chart summarizing another exemplary method of installing a leveling system on a vehicle frame.

FIG. 11 shows a flowchart summarizing another exemplary method 1100 of mounting a jack of a leveling system to a vehicle according to the invention. In a first step 1102, a jack including a first frame engaging feature and a second frame engaging feature is provided. In an optional second step 1104, a frame attachment is removed from the frame to expose manufacturer-provided features of the frame. In a third step 1106, the jack is aligned with the frame such that the first frame engaging feature is aligned with a first manufacturer-provided feature of the frame and the second frame engaging feature is aligned with a second manufacturer-provided feature of the frame. In a fourth step 1108, the first frame engaging feature is secured to the first manufacturer-provided feature, and in a fifth step 1110, the second frame engaging feature is secured to the second manufacturer-provided feature.

The description of particular embodiments of the present invention is now complete. Many of the described features may be substituted, altered or omitted without departing from the scope of the invention. For example, alternative brackets between the jack cylinder and frame (e.g., one that receives force from the top of the jack cylinder, etc.) can be employed. As another example, although some example embodiments were described with respect to the rear of a vehicle, either embodiment could be used to fix a jack near the front of a vehicle, by using the floor of the cab or the attachment point of the front bumper. As still another example, a different cross-member/brace (e.g., a flat plate, etc.) could be used between adjacent jacks to stabilize them. These and other deviations from the particular embodiments shown will be apparent to those skilled in the art, particularly in view of the foregoing disclosure.

We claim:

1. A vehicle leveling system comprising:
a first jack including an upper section and a lower section, said lower section extendable with respect to said upper section;
a bracket assembly fixed to said upper section of said jack, said bracket assembly including a first upright member having a side surface, a horizontal member having a top surface, and a second upright member extending upwardly from said horizontal member and including a side surface, said side surface of said second upright member facing said side surface of said first upright member, a distance between said side surface of said first upright member and said side surface of said second upright member being adjustable, said top surface of said horizontal member, said side surface of said first upright member, and said side surface of said second upright member defining a receiving space for a portion of a vehicle frame, said bracket assembly further including an anchor disposed to suspend said bracket from another portion of said vehicle adjacent said vehicle frame and operative to preclude rotation of said bracket about a horizontal axis passing through said receiving space and parallel to said frame of said vehicle when said anchor is fixed to said vehicle; and
a fastener coupled to selectively fix a position of said second upright member with respect to said first upright member.

2. The vehicle leveling system of claim 1, wherein:
one of said horizontal member and said first upright member defines a first horizontally elongated slot;
the other of said horizontal member and said first upright member defines an aperture;
said fastener is disposed through said first horizontally elongated slot and said aperture;
said horizontal member is horizontally adjustable with respect to said first upright member when said fastener is free to move within said first horizontally elongated slot; and
said horizontal member is fixed in position with respect to said first upright member when said fastener is secured to prevent movement of said fastener within said first horizontally elongated slot.

3. The vehicle leveling system of claim 2, wherein:
said horizontal member defines said horizontally elongated slot; and
said first upright member defines said aperture.

4. The vehicle leveling system of claim 2, wherein:
said one of said horizontal member and said first upright member defines a second horizontally elongated slot;
said other of said horizontal member and said first upright member defines a second aperture;
said bracket assembly further includes a second fastener disposed through said second horizontally elongated slot and said second aperture;
said horizontal member is horizontally adjustable with respect to said first upright member when said fastener is free to move within said first horizontally elongated slot and said second fastener is free to move within said second horizontally elongated slot;
said horizontal member is fixed in position with respect to said first upright member when said fastener is secured to prevent movement of said fastener within said first horizontally elongated slot and said second fastener is secured to prevent movement of said second fastener within said second horizontally elongated slot; and
when secured, said second fastener resists rotation of said horizontal member about said fastener when a load is imparted on said top surface of said horizontal member.

5. The vehicle leveling system of claim 2, wherein:
at least one of said anchor and said first upright member defines a vertically elongated slot;
the other of said anchor and said first upright member defines a vertical securement aperture;
said bracket assembly includes a vertical adjustment fastener disposed through said vertically elongated slot and said vertical securement aperture;
said first upright member is vertically adjustable with respect to said anchor when said vertical adjustment fastener is free to move within said vertically elongated slot; and said first upright member is fixed in position with respect to said anchor when said vertical adjustment fastener is secured to prevent movement of said vertical adjustment fastener within said vertically elongated slot.

6. The vehicle leveling system of claim 5, wherein:
said anchor defines said vertically elongated slot; and
said first upright member defines said vertical securement aperture.

7. The vehicle leveling system of claim 1, wherein:
at least one of said anchor and said first upright member defines a vertically elongated slot;
the other of said anchor and said first upright member defines a vertical securement aperture;
said bracket assembly includes a vertical adjustment fastener disposed through said vertically elongated slot and said vertical securement aperture;
said first upright member is vertically adjustable with respect to said anchor when said vertical adjustment fastener is free to move within said vertically elongated slot; and
said first upright member is fixed in position with respect to said anchor when said vertical adjustment fastener is secured to prevent movement of said vertical adjustment fastener within said vertically elongated slot.

8. The vehicle leveling system of claim 7, wherein:
said at least one of said anchor and said first upright member defines a second vertically elongated slot;
said other of said anchor and said first upright member defines a second vertical securement aperture;
said bracket assembly includes a second vertical adjustment fastener disposed through said second vertically elongated slot and said second vertical securement aperture;
said first upright member is vertically adjustable with respect to said anchor when said vertical adjustment fastener is free to move within said vertically elongated slot and said second vertical adjustment fastener is free to move within said second vertically elongated slot; and
said first upright member is fixed in position with respect to said anchor when said vertical adjustment fastener and said second vertical adjustment fastener are secured.

9. The vehicle leveling system of claim 1, wherein said second upright member is an integral part of said horizontal member.

10. The vehicle leveling system of claim 1, wherein said bracket assembly further includes:
a second horizontal member having a top surface; and
a third upright member extending upwardly from said second horizontal member and including a side surface; and wherein said side surface of said third upright member faces said side surface of said first upright member;
a distance between said side surface of said third upright member and said side surface of said first upright member is adjustable; and
said top surface of said second horizontal member and said side surface of said third upright member define a portion of said receiving space.

11. The vehicle leveling system of claim 10, wherein:
one of said horizontal member and said first upright member defines a first horizontally elongated slot;
the other of said horizontal member and said first upright member defines an aperture;
said fastener is disposed through said first horizontally elongated slot and said aperture;

said horizontal member is horizontally adjustable with respect to said first upright member when said fastener is free to move within said first horizontally elongated slot;
said horizontal member is fixed in position with respect to said first upright member when said fastener is secured to prevent movement of said fastener within said first horizontally elongated slot;
one of said second horizontal member and said first upright member defines a second horizontally elongated slot;
the other of said second horizontal member and said first upright member defines a second aperture;
said fastener is disposed through said second horizontally elongated slot and said second aperture;
said second horizontal member is horizontally adjustable with respect to said first upright member when said fastener is free to move within said second horizontally elongated slot; and
said second horizontal member is fixed in position with respect to said first upright member when said fastener is secured to prevent movement of said fastener within said second horizontally elongated slot.

12. The vehicle leveling system of claim 11, wherein:
said horizontal member defines said first horizontally elongated slot;
said first upright member defines said first aperture;
said second horizontal member defines said second horizontally elongated slot; and
said first upright member defines said second aperture.

13. The vehicle leveling system of claim 11, wherein:
said one of said horizontal member and said first upright member defines a third horizontally elongated slot;
said other of said horizontal member and said first upright member defines a third aperture;
said bracket assembly further includes a second fastener disposed through said third horizontally elongated slot and said third aperture;
said horizontal member is horizontally adjustable with respect to said first upright member when said fastener is free to move within said first horizontally elongated slot and said second fastener is free to move within said third horizontally elongated slot;
said horizontal member is fixed in position with respect to said first upright member when said fastener is secured to prevent movement of said fastener within said first horizontally elongated slot and said second fastener is secured to prevent movement of said second fastener within said third horizontally elongated slot;
when secured, said second fastener resists rotation of said horizontal member about said fastener when a load is imparted on said top surface of said horizontal member;
said one of said second horizontal member and said first upright member defines a fourth horizontally elongated slot;
said other of said second horizontal member and said first upright member defines a fourth aperture;
said second horizontal member is horizontally adjustable with respect to said first upright member when said fastener is free to move within said second horizontally elongated slot and said second fastener is free to move within said fourth horizontally elongated slot;
said second horizontal member is fixed in position with respect to said first upright member when said fastener is secured to prevent movement of said fastener within said second horizontally elongated slot and said second fastener is secured to prevent movement of said second fastener within said fourth horizontally elongated slot; and when secured, said second fastener resists rotation of said second horizontal member about said fastener when a load is imparted on said top surface of said second horizontal member.

14. The vehicle leveling system of claim 10, further comprising a second anchor, and wherein:
at least one of said anchor and said first upright member defines a vertically elongated slot;
the other of said anchor and said first upright member defines a vertical securement aperture;
said bracket assembly includes a vertical adjustment fastener disposed through said vertically elongated slot and said vertical securement aperture;
said first upright member is vertically adjustable with respect to said anchor when said vertical adjustment fastener is free to move within said vertically elongated slot;
said first upright member is fixed in position with respect to said anchor when said vertical adjustment fastener is secured to prevent movement of said vertical adjustment fastener within said vertically elongated slot;
at least one of said second anchor and said first upright member defines a second vertically elongated slot;
the other of said second anchor and said first upright member defines a second vertical securement aperture;
said vertical adjustment fastener is disposed through said second vertically elongated slot and said second vertical securement aperture;
said first upright member is vertically adjustable with respect to said second anchor when said vertical adjustment fastener is free to move within said second vertically elongated slot; and
said first upright member is fixed in position with respect to said second anchor when said vertical adjustment fastener is secured to prevent movement of said vertical adjustment fastener within said second vertically elongated slot.

15. The vehicle leveling system of claim 14, wherein:
said anchor defines said vertically elongated slot;
said first upright member defines said vertical securement aperture;
said second anchor defines said second vertically elongated slot; and
said first upright member defines said second vertical securement aperture.

16. The vehicle leveling system of claim 14, wherein:
said at least one of said anchor and said first upright member defines a third vertically elongated slot;
said other of said anchor and said first upright member defines a third vertical securement aperture;
said bracket assembly includes a second vertical adjustment fastener disposed through said third vertically elongated slot and said third vertical securement aperture;
said first upright member is vertically adjustable with respect to said anchor when said vertical adjustment fastener is free to move within said vertically elongated slot and said second vertical adjustment fastener is free to move within said third vertically elongated slot;
said first upright member is fixed in position with respect to said anchor when said vertical adjustment fastener and said second vertical adjustment fastener are secured;

said at least one of said second anchor and said first upright member defines a fourth vertically elongated slot;
said other of said second anchor and said first upright member defines a fourth vertical securement aperture;
said second vertical adjustment fastener is disposed through said fourth vertically elongated slot and said fourth vertical securement aperture;
said first upright member is vertically adjustable with respect to said second anchor when said vertical adjustment fastener is free to move within said second vertically elongated slot and said second vertical adjustment fastener is free to move within said fourth vertically elongated slot; and
said first upright member is fixed in position with respect to said second anchor when said first vertical adjustment fastener and said second vertical adjustment fastener are secured.

17. The vehicle leveling system of claim 14, wherein:
one of said horizontal member and said first upright member defines a first horizontally elongated slot;
the other of said horizontal member and said first upright member defines an aperture;
said fastener is disposed through said first horizontally elongated slot and said aperture;
said horizontal member is horizontally adjustable with respect to said first upright member when said fastener is free to move within said first horizontally elongated slot;
said horizontal member is fixed in position with respect to said first upright member when said fastener is secured to prevent movement of said fastener within said first horizontally elongated slot;
one of said second horizontal member and said first upright member defines a second horizontally elongated slot;
the other of said second horizontal member and said first upright member defines a second aperture;
said fastener is disposed through said second horizontally elongated slot and said second aperture;
said second horizontal member is horizontally adjustable with respect to said first upright member when said fastener is free to move within said second horizontally elongated slot; and
said second horizontal member is fixed in position with respect to said first upright member when said fastener is secured to prevent movement of said fastener within said second horizontally elongated slot.

18. The vehicle leveling system of claim 14, wherein:
said first upright member includes said surface, a second surface, and a third surface, said second surface and said third surface extending from opposite edges of said surface at non-zero angles;
said second surface defines one of said first horizontally elongated slot and said aperture;
said second surface defines one of said vertically elongated slot and said vertical securement aperture;
said third surface defines one of said second horizontally elongated slot and said second aperture; and
said third surface defines one of said second vertically elongated slot and said second vertical securement aperture.

* * * * *